(12) United States Patent
Bunya et al.

(10) Patent No.: US 11,805,577 B2
(45) Date of Patent: Oct. 31, 2023

(54) INDUCTION COOKER

(71) Applicant: Mitsubishi Electric Corporation, Tokyo (JP)

(72) Inventors: Jun Bunya, Tokyo (JP); Ikuro Suga, Tokyo (JP); Miyuki Takeshita, Tokyo (JP); Ryota Asakura, Tokyo (JP); Kazuhiro Kameoka, Saitama (JP)

(73) Assignee: Mitsubishi Electric Corporation, Tokyo (JP)

( * ) Notice: Subject to any disclaimer, the term of this patent is extended or adjusted under 35 U.S.C. 154(b) by 604 days.

(21) Appl. No.: 16/760,601

(22) PCT Filed: Nov. 8, 2017

(86) PCT No.: PCT/JP2017/040235
§ 371 (c)(1),
(2) Date: Apr. 30, 2020

(87) PCT Pub. No.: WO2019/092803
PCT Pub. Date: May 16, 2019

(65) Prior Publication Data
US 2021/0227644 A1    Jul. 22, 2021

(51) Int. Cl.
*H05B 6/06* (2006.01)
*H05B 6/12* (2006.01)

(52) U.S. Cl.
CPC .......... *H05B 6/065* (2013.01); *H05B 6/1272* (2013.01); *H05B 2213/05* (2013.01)

(58) Field of Classification Search
CPC ... H05B 6/00; H05B 6/02; H05B 6/06; H05B 6/062; H05B 6/065; H05B 6/08;
(Continued)

(56) References Cited

U.S. PATENT DOCUMENTS

| 2012/0305545 A1* | 12/2012 | Brosnan | H05B 6/065 |
| | | | 219/622 |
| 2015/0250027 A1* | 9/2015 | Takano | H05B 6/062 |
| | | | 219/664 |
| 2016/0381736 A1* | 12/2016 | Christiansen | H05B 6/1272 |
| | | | 219/624 |

FOREIGN PATENT DOCUMENTS

| EP | 3133899 A1 * | 2/2017 | ............ H05B 6/065 |
| JP | 2008-027728 A | 2/2008 | |
| (Continued) | | | |

OTHER PUBLICATIONS

International Search Report of the International Searching Authority dated Feb. 13, 2018 for the corresponding international application No. PCT/JP2017/040235 (and English translation).

*Primary Examiner* — Thien S Tran
*Assistant Examiner* — Theodore J Evangelista
(74) *Attorney, Agent, or Firm* — POSZ LAW GROUP, PLC

(57) ABSTRACT

An induction cooker includes a first coil, a second coil, a third coil, and a controller. Responsive to determining that a heating target placed above a first coil is formed of a magnetic material, a heating target placed above a second coil is formed of a magnetic material or a composite containing a magnetic material and a non-magnetic material, and a heating target placed above a third coil is formed of a non-magnetic material, the controller stops an operation of a first inverter circuit, causes a second inverter circuit and a third inverter circuit to operate, and sets a frequency of a third high-frequency current to be higher than a frequency of a second high-frequency current.

13 Claims, 10 Drawing Sheets

(58) Field of Classification Search
CPC ...... H05B 6/12; H05B 6/1209; H05B 6/1245; H05B 6/1272; H05B 6/36; H05B 2206/00; H05B 2206/02; H05B 2213/00; H05B 2213/05; H05B 2214/00
See application file for complete search history.

(56) References Cited

FOREIGN PATENT DOCUMENTS

| | | |
|---|---|---|
| JP | 2011-258339 A | 12/2011 |
| JP | 2012-099338 A | 5/2012 |
| JP | 5213937 B2 | 6/2013 |

* cited by examiner

INDUCTION COOKER

CROSS REFERENCE TO RELATED APPLICATION

This application is a U.S. national stage application of PCT/JP2017/040235 filed on Nov. 8, 2017, the contents of which are incorporated herein by reference.

TECHNICAL FIELD

The present invention relates to an induction cooker having a plurality of coils.

BACKGROUND ART

An induction cooker has been conventionally proposed, including a plurality of heating coils, in which the heating coil over which a heating target is not disposed is supplied with electric power smaller than electric power supplied to the heating coil over which a heating target is disposed (for example, see Patent Literature 1).

CITATION LIST

Patent Literature

Patent Literature 1: Japanese Patent No. 5213937

SUMMARY OF INVENTION

Technical Problem

Some heating targets to be heated by an induction cooker are formed of a composite of a non-magnetic metal with a magnetic metal attached thereto. An example of such a heating target is a "magnetic-layer attached frying pan" where a magnetic metal, such as stainless steel, is attached to the center portion of the bottom of the frying pan formed of a non-magnetic aluminum material. In a typical heating target formed of a composite, a magnetic material is attached to the flat center portion of the non-magnetic bottom surface, but a curved outer peripheral portion of the bottom surface has no magnetic material.

However, while power distribution for each of the heating coils is changed according to an outer diameter of the heating target, the induction cooker disclosed in Patent Literature 1 performs no control according to a material of the heating target. Therefore, when the heating target formed of a composite is inductively heated, there is a problem where the induction heating suitable for the material of the heating target cannot be achieved, resulting in unevenness in heating temperature.

An object of the present invention, which has been made to overcome the above problems, is to obtain an induction cooker making it possible to suppress unevenness in heating temperature when a heating target formed of a composite is inductively heated.

Solution to Problem

An induction cooker according to an embodiment of the present invention includes a first coil; a second coil disposed on an outer peripheral side of the first coil, a third coil disposed on an outer peripheral side of the second coil; a first inverter circuit configured to supply a first high-frequency current to the first coil; a second inverter circuit configured to supply a second high-frequency current to the second coil; a third inverter circuit configured to supply a third high-frequency current to the third coil; and a controller configured to control driving of the first inverter circuit, the second inverter circuit and the third inverter circuit, and when a heating target placed above the first coil is formed of a magnetic material, the heating target placed above the second coil is formed of a magnetic material or a composite containing a magnetic material and a non-magnetic material, and the heating target placed above the third coil is formed of a non-magnetic material, stop operation of the first inverter circuit, cause the second inverter circuit and the third inverter circuit to operate, and set a frequency of the third high-frequency current to be higher than a frequency of the second high-frequency current.

Advantageous Effects of Invention

According to an embodiment of the present invention, when the heating target placed above the first coil is formed of a magnetic material, the heating target placed above the second coil is formed of a magnetic material or a composite containing a magnetic material and a non-magnetic material, and the heating target placed above the third coil is formed of a non-magnetic material, the operation of the first inverter circuit is stopped, the second inverter circuit and the third inverter circuit are caused to operate, and the frequency of the third high-frequency current is set to be higher than the frequency of the second high-frequency current.

Therefore, when a heating target formed of a composite is inductively heated, it is possible to perform the induction heating suitable for the material of the heating target, and thus unevenness in heating temperature can be suppressed.

DESCRIPTION OF EMBODIMENTS

Embodiment 1

Figure 1:
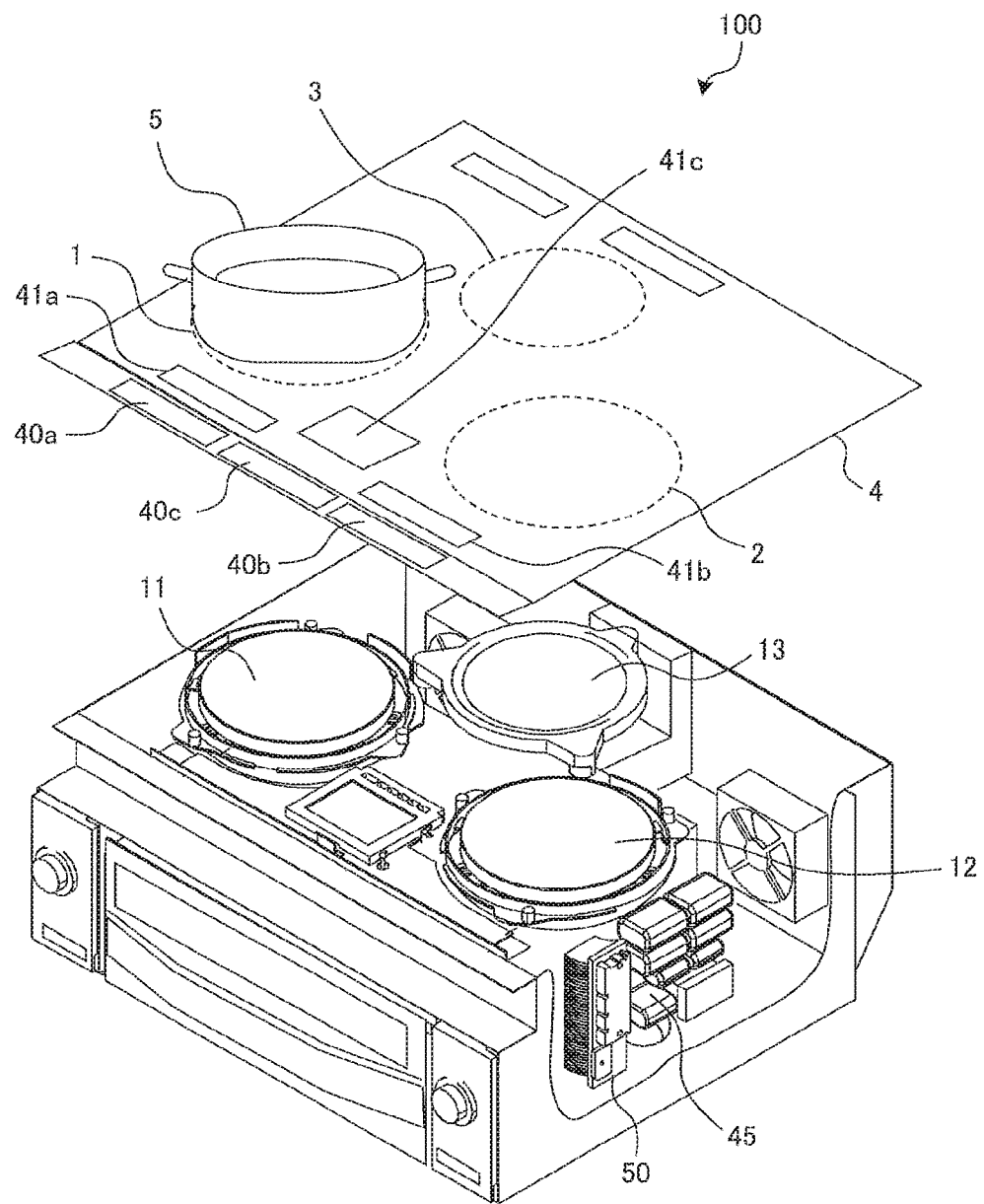
FIG. 1 is an exploded perspective view illustrating an induction cooker according to Embodiment 1.

FIG. 1 is an exploded perspective view illustrating an induction cooker according to Embodiment 1.

As illustrated in FIG. 1, an upper portion of an induction cooker 100 includes a top plate 4 on which a heating target 5, such as a pot, is to be placed. The top plate 4 includes a first induction heating zone 1 and a second induction heating zone 2 as heating zones for inductivity heating the heating target 5. The first induction heating zone 1 and the second induction heating zone 2 are laterally disposed side by side in an area close to a front edge of the top plate 4. The induction cooker 100 according to Embodiment 1 also includes a third induction heating zone 3 as a third heating zone. The third induction heating zone 3 is located behind the first induction heating zone 1 and the second induction heating zone 2 and in a substantial center area in the lateral direction of the top plate 4.

Under the first induction heating zone 1, the second induction heating zone 2, and the third induction heating zone 3, a first induction heating unit 11, a second induction heating unit 12, and a third induction heating unit 13 are provided, respectively, each of which heats the heating target 5 placed on the corresponding heating zone. Each of the heating units is made up of coils (see FIG. 2).

The whole of the top plate 4 is formed of an infrared transmitting material, such as heat-resistant reinforced glass or crystallized glass. On the top plate 4, circular pot position marks roughly indicating pot placement positions are formed by painting, printing, or the like, for example, corresponding to respective heating areas of the first induction heating unit 11, the second induction heating unit 12, and the third induction heating unit 13.

An operation unit 40 is provided at a position close to the front edge of the top plate 4, the operation unit 40 serving as an input device for setting electric power to be input, a cooking menu and the like when the heating target 5 or the like is heated by the corresponding one of the first induction heating unit 11, the second induction heating unit 12, and the third induction heating unit 13. In Embodiment 1, the operation unit 40 is divided into an operation unit 40a, an operation unit 40b, and an operation unit 40c, which are provided for the respective induction heating coils.

A display unit 41 is provided as a notification unit, near the operation unit 40. The display unit 41 displays information, such as an operating state of each of the induction heating coils, and details of an operation and an input from the operation unit 40. In Embodiment 1, the display unit 41 is divided into a display unit 41a, a display unit 41b, and a display unit 41c, which are provided for the respective induction heating coils.

It should be noted that each of the operation unit 40 and the display unit 41 is not limited to the case where it is divided into operation or display units, which are provided for the respective induction heating units as described above or the case where it is shared among the respective induction heating units. The operation unit 40 is constituted by, for example, a mechanical switch, such as a push switch or a tactile switch, or a touch switch for detecting an input operation based on a change in electrode capacitance. Also, the display unit 41 is constituted by, for example, an LCD, an LED or the like.

The operation unit 40 and the display unit 41 may be combined into an operation and display unit 43. The operation and display unit 43 is constituted by, for example, a touch panel or the like provided with a touch switch located on an upper surface of an LCD.

LCD is an abbreviation for Liquid Crystal Device. LED is an abbreviation for Light Emitting Diode.

The induction cooker 100 includes therein drive circuits 50 configured to supply high-frequency power to the coils of the first induction heating unit 11, the second induction heating unit 12, and the third induction heating unit 13, and a controller 45 for controlling the operation of the entire induction cooker including the drive circuits 50.

When high-frequency power is supplied to the first induction heating unit 11, the second induction heating unit 12, and the third induction heating unit 13 by the respective drive circuits 50, a high-frequency magnetic field is generated from each of coils of the respective induction heating units. The configuration of each of the drive circuits 50 will be described later in detail.

The first induction heating unit 11, the second induction heating unit 12, and the third induction heating unit 13 are configured as described below, for example. It should be noted that the first induction heating unit 11, the second induction heating unit 12, and the third induction heating unit 13 have the same configuration. Therefore, the configuration will be described below by referring to the configuration of the first induction heating unit 11.

Figure 2:
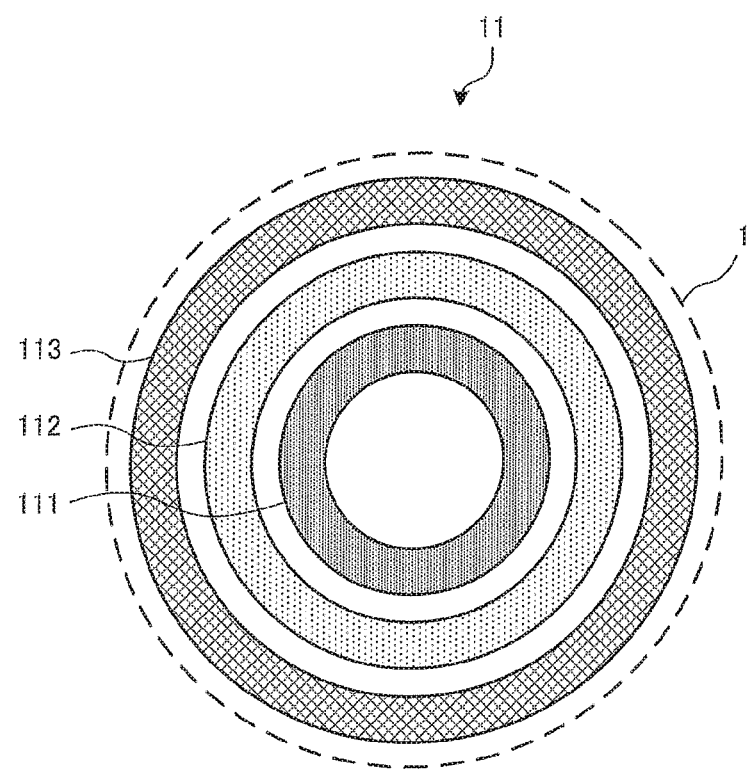
FIG. 2 is a plan view illustrating a first induction heating unit of the induction cooker according to Embodiment 1.

FIG. 2 is a plan view illustrating the first induction heating unit of the induction cooker according to Embodiment 1.

The first induction heating unit 11 is made up of a plurality of ring-shaped coils that are concentrically disposed and are different from one another in diameter. FIG. 2 illustrates the first induction heating unit 11 made up of three ring-shaped coils, for example. The first induction heating unit 11 includes an inner-peripheral coil 111 disposed at the center of the first induction heating zone 1, an intermediate coil 112 disposed on the outer peripheral side of the inner-peripheral coil 111, and an outer-peripheral coil 113 disposed on the outer peripheral side of the intermediate coil 112.

Each of the inner-peripheral coil 111, the intermediate coil 112, and the outer-peripheral coil 113 is formed by winding a conductive wire formed of insulation-coated metal. Arbitrary metal, such as copper or aluminum, for example, may be used for the conductive wire. Each of the inner-peripheral coil 111, the intermediate coil 112, and the outer-peripheral coil 113 is formed such that a conductive wire is independently wound.

The area of the inner-peripheral coil 111 as viewed in a plan view is smaller than the area of the intermediate coil 112 as viewed in a plan view. Further, the area of the intermediate coil 112 as viewed in a plan view is smaller than the area of the outer-peripheral coil 113 as viewed in a plan view.

In the description made hereinafter, the inner-peripheral coil 111, the intermediate coil 112, and the outer-peripheral coil 113 may be collectively referred to as coils.

Figure 3:
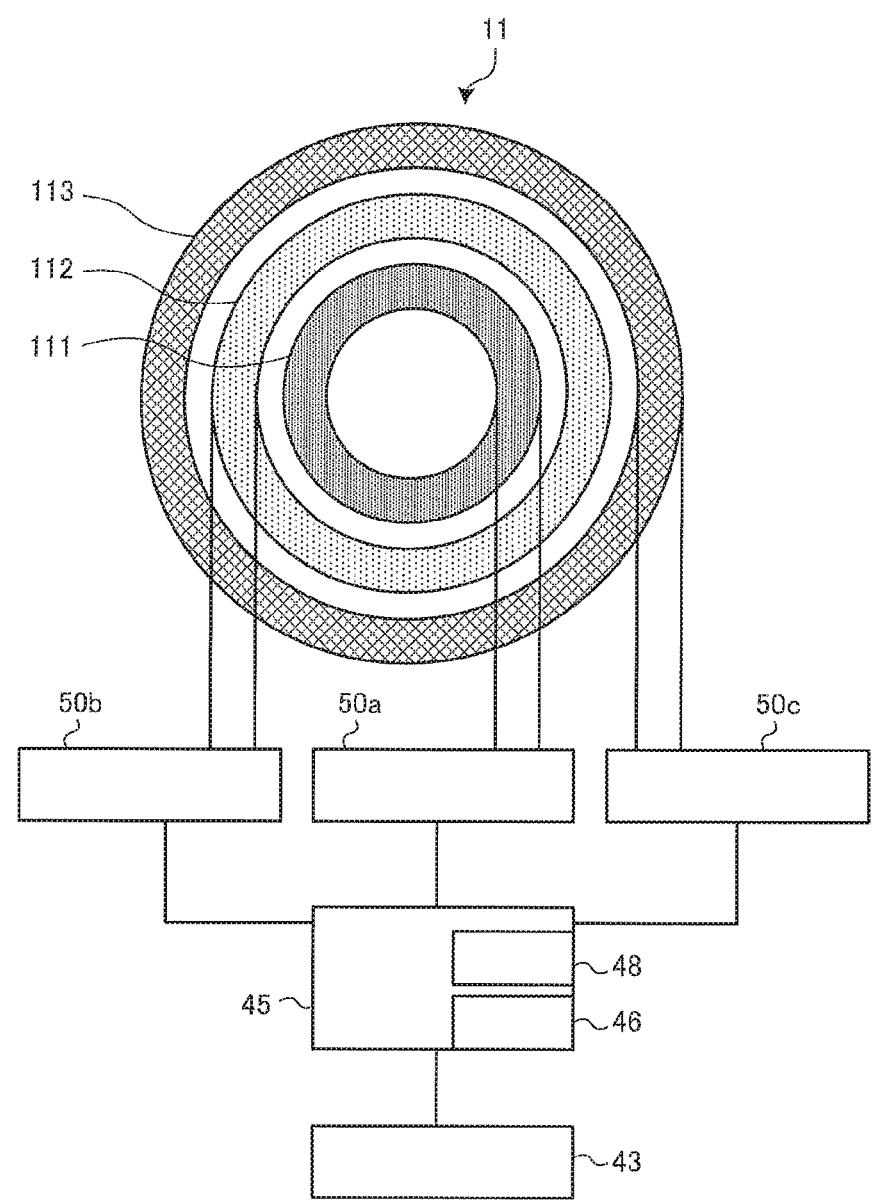
FIG. 3 is a block diagram illustrating a configuration of the induction cooker according to Embodiment 1.

FIG. 3 is a block diagram illustrating a configuration of the induction cooker according to Embodiment 1.

As illustrated in FIG. 3, the first induction heating unit 11 is controlled to be driven by a drive circuit 50a, a drive circuit 50b, and a drive circuit 50c. More specifically, the inner-peripheral coil 111 is controlled to be driven by the drive circuit 50a. The intermediate coil 112 is controlled to be driven by the drive circuit 50b. The outer-peripheral coil 113 is controlled to be driven by the drive circuit 50c.

When a high-frequency current is supplied to the inner-peripheral coil 111 from the drive circuit 50a, a high-frequency magnetic field is generated from the inner-peripheral coil 111. When a high-frequency current is supplied to the intermediate coil 112 from the drive circuit 50b, a high-frequency magnetic field is generated from the intermediate coil 112. When a high-frequency current is supplied to the outer-peripheral coil 113 from the drive circuit 50c, a high-frequency magnetic field is generated from the outer-peripheral coil 113.

The controller 45 is constituted by dedicated hardware or a CPU that executes a program stored in a memory 48. The controller 45 includes a load determining unit 46 configured to determine a material of the heating target 5 disposed above the inner-peripheral coil 111, the intermediate coil 112, and the outer-peripheral coil 113.

CPU is an abbreviation for Central Processing Unit. CPU is also referred to as a central processing unit, a processing unit, an arithmetic unit, a microprocessor, a microcomputer, or a processor.

In the case where the controller 45 is constituted by dedicated hardware, the controller 45 corresponds to, for example, a single circuit, a composite circuit, an ASIC, an FPGA, or a combination of these circuits. Each of functional units implemented by the controller 45 may be realized by individual hardware, or the respective functional units may be realized by single hardware.

ASIC is an abbreviation for Application Specific Integrated Circuit. FPGA is an abbreviation for Field-Programmable Gate Array.

In the case where the controller 45 is constituted by a CPU, each of functions to be implemented by the controller 45 is realized by software, firmware or a combination of software and firmware. The software and firmware are described as a program, and stored in the memory 48. The CPU reads and executes the program stored in the memory 48, thereby realizing each function of the controller 45. The memory 48 is, for example, a non-volatile or volatile semiconductor memory, such as a RAM, a ROM, a flash memory, an EPROM, or an EEPROM.

The functions of the controller 45 may be partially realized by dedicated hardware, and may be partially realized by software or firmware.

RAM is an abbreviation for Random Access Memory. ROM is an abbreviation for Read Only Memory. EPROM is an abbreviation for Erasable Programmable Read Only Memory. EEPROM is an abbreviation for Electrically Erasable Programmable Read-Only Memory.

Figure 4:
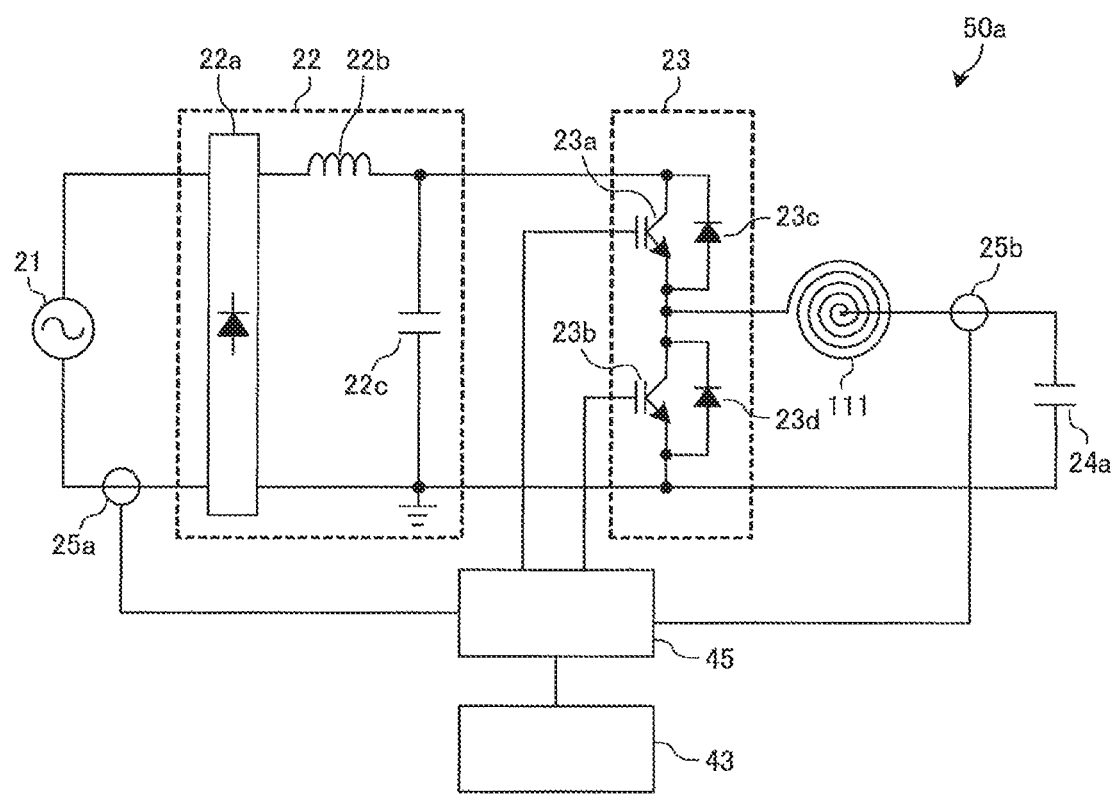
FIG. 4 is a diagram illustrating one of drive circuits of the induction cooker according to Embodiment 1.

FIG. 4 is a diagram illustrating one of the drive circuits of the induction cooker according to Embodiment 1.

The drive circuits 50, which are provided for the respective heating units, may have the same circuit configuration, or may have different circuit configurations for the respective heating units. FIG. 4 illustrates the drive circuit 50a that drives the inner-peripheral coil 111.

As illustrated in FIG. 4, the drive circuit 50a includes a direct-current power supply circuit 22, an inverter circuit 23, and a resonant capacitor 24a.

An input current detecting unit 25a is constituted by, for example, a current sensor. The input current detecting unit 25a detects a current input from an alternating-current power supply 21 to the direct-current power supply circuit 22, and outputs a voltage signal corresponding to a value of the input current to the controller 45.

The direct-current power supply circuit 22 includes a diode bridge 22a, a reactor 22b, and a smoothing capacitor 22c. The direct-current power supply circuit 22 converts an alternating-current voltage input from the alternating-current power supply 21 into a direct-current voltage, and outputs the direct-current voltage to the inverter circuit 23.

In the inverter circuit 23, an IGBT 23a and an IGBT 23b serving as switching elements are connected in series to the output of the direct-current power supply circuit 22. In the inverter circuit 23, a diode 23c and a diode 23d serving as flywheel diodes are respectively connected in parallel to the IGBT 23a and the IGBT 23b. The inverter circuit 23 is a so-called half-bridge type inverter.

The IGBT 23a and the IGBT 23b are driven to be turned on and off with drive signals output from the controller 45. The controller 45 outputs drive signals for alternately turning on and off the IGBT 23a and the IGBT 23b, so that the IGBT 23b is deactivated while the IGBT 23a is activated, and the IGBT 23b is activated while the IGBT 23a is deactivated. In this manner, the inverter circuit 23 converts direct-current power output from the direct-current power supply circuit 22 into alternating-current power at a high frequency of approximately 20 kHz to 100 kHz, and supplies the alternating-current power to a resonant circuit made up of the inner-peripheral coil 111 and the resonant capacitor 24a.

The resonant capacitor 24a is connected in series to the inner-peripheral coil 111. The resonant circuit has a resonant frequency that depends on the inductance of the inner-peripheral coil 111 and the capacitance of the resonant capacitor 24a. The inductance of the inner-peripheral coil 111 changes according to a characteristic of a metal load when the heating target 5, which is the metal load, is magnetically coupled to the inner-peripheral coil 111, and the resonant frequency of the resonant circuit changes according to the change in the inductance of the inner-peripheral coil 111.

With such a configuration, a high-frequency current of approximately tens of amperes flows through the inner-peripheral coil 111. The heating target 5 placed on the top plate 4 immediately above the inner-peripheral coil 111 is inductively heated by the high-frequency magnetic flux generated by the high-frequency current flowing through the inner-peripheral coil 111.

Each of the IGBTs 23a and the IGBT 23b serving as switching elements is constituted by, for example, a silicon-based semiconductor, but may be constituted by a wide-bandgap semiconductor, such as a silicon carbide-based material or a gallium nitride-based material.

With the use of the wide-bandgap semiconductors as the switching elements, power supply loss of the switching elements can be reduced. Further, since heat dissipation from the drive circuit 50a is satisfactory even when the driving frequency is set to be high frequency, that is, even when switching is performed at a high speed, radiation fins of the drive circuit 50 can be made smaller, thus realizing a reduction in size and cost of the drive circuit 50a.

A coil current detecting unit 25b is connected to the resonant circuit made up of the inner-peripheral coil 111 and the resonant capacitor 24a. The coil current detecting unit 25b is constituted by, for example, a current sensor. The coil current detecting unit 25b detects a current flowing through the inner-peripheral coil 111, and outputs a voltage signal corresponding to a value of the coil current to the controller 45.

The drive circuit 50a that drives the inner-peripheral coil 111 has been described with reference to FIG. 4. A configuration similar to the configuration of the drive circuit 50a is also applicable to the drive circuit 50b that drives the intermediate coil 112 and the drive circuit 50c that drives the outer-peripheral coil 113.

The inner-peripheral coil 111 corresponds to "first coil" according to the present invention.

The intermediate coil 112 corresponds to "second coil" according to the present invention.

The outer-peripheral coil 113 corresponds to "third coil" according to the present invention.

The drive circuit 50a corresponds to "first inverter circuit" according to the present invention.

The drive circuit 50b corresponds to "second inverter circuit" according to the present invention.

The drive circuit 50c corresponds to "third inverter circuit" according to the present invention.

The high-frequency current to be supplied to the inner-peripheral coil 111 from the drive circuit 50a corresponds to "first high-frequency current" according to the present invention.

The high-frequency current to be supplied to the intermediate coil 112 from the drive circuit 50b corresponds to "second high-frequency current" according to the present invention.

The high-frequency current to be supplied to the outer-peripheral coil 113 from the drive circuit 50c corresponds to "third high-frequency current" according to the present invention.

(Operation)

An operation of the induction cooker according to Embodiment 1 will be now described.

When a user disposes the heating target 5 on one of the heating zones and issues an instruction to start heating (input heating power) via the operation and display unit 43, the load determining unit 46 of the controller 45 performs a load determining process.

Figure 5:
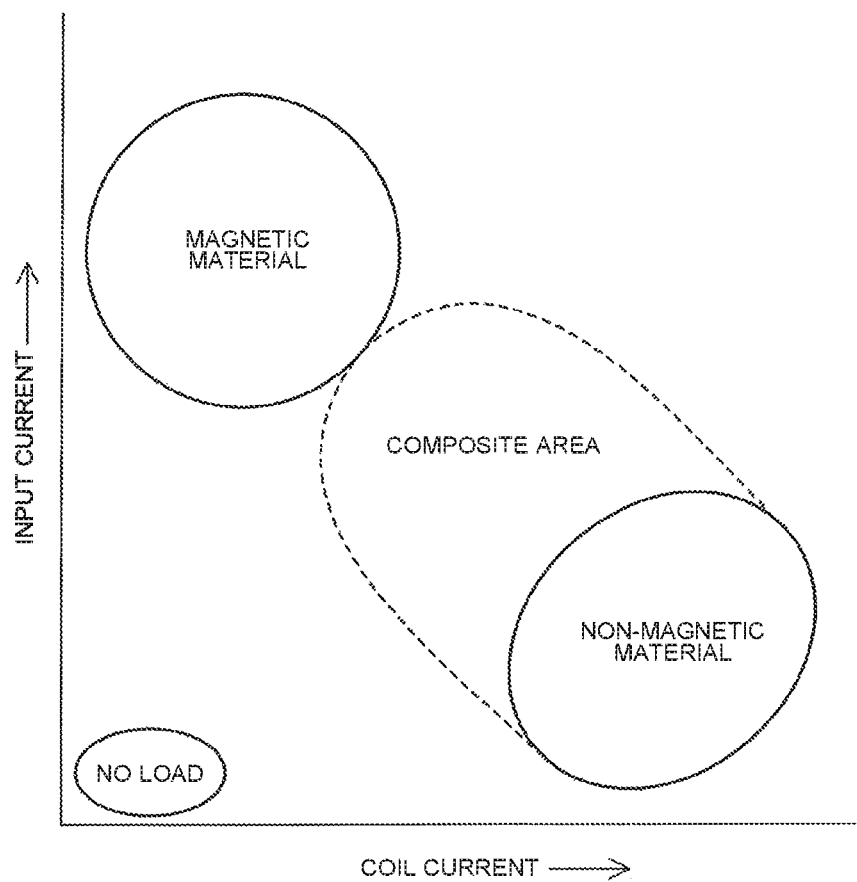
FIG. 5 is a load determining characteristic graph based on the relationship between a coil current and an input current in the induction cooker according to Embodiment 1.

FIG. 5 is a load determining characteristic graph based on the relationship between a coil current and an input current in the induction cooker according to Embodiment 1.

As illustrated in FIG. 5, the relationship between the coil current and the input current changes depending on the material of the load disposed above the inner-peripheral coil 111, the intermediate coil 112, and the outer-peripheral coil 113. The controller 45 stores in advance in the memory 48 a load determining table, which is a table of the relationship between the coil current and the input current illustrated in FIG. 5.

In the load determining process, the controller 45 drives the inverter circuit 23 of each of the drive circuits 50a to 50c with a specific drive signal for load determination, and detects the input current from the signal output from the input current detecting unit 25a. At the same time, the controller 45 detects the coil current from the signal output from the coil current detecting unit 25b. The load determining unit 46 of the controller 45 determines the material of the load disposed above the coil based on the detected coil current, the detected input current, and the load determining table representing the relationship of FIG. 5.

The material of the heating target 5 serving as a load is broadly classified into a magnetic material, such as iron or SUS 430, and a non-magnetic material, such as aluminum or copper. Some heating targets 5 are formed of a composite of a non-magnetic material with a magnetic material attached thereto.

Figure 6:
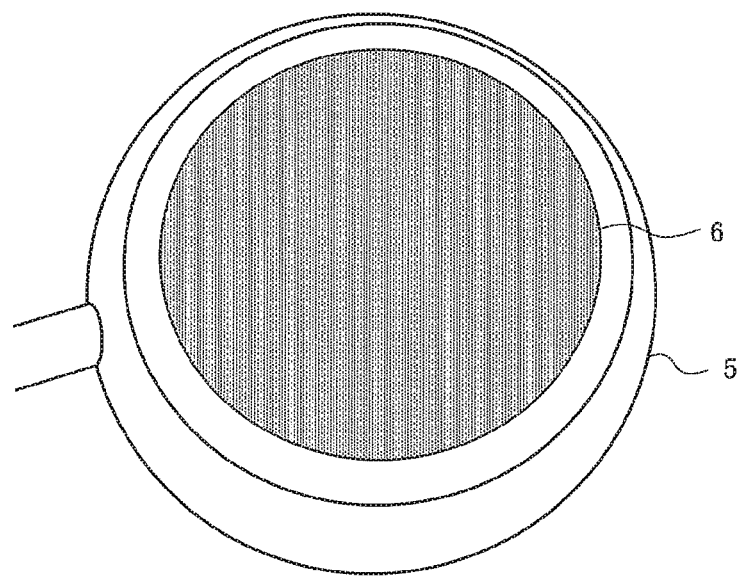
FIG. 6 is a diagram illustrating a heating target formed of a composite to be inductively heated by the induction cooker according to Embodiment 1.

FIG. 6 is a diagram illustrating a heating target formed of a composite to be inductively heated by the induction cooker according to Embodiment 1. FIG. 6 is a diagram illustrating the heating target 5 as viewed from a bottom surface of the heating target 5.

As illustrated in FIG. 6, the heating target 5 formed of a composite is formed by, for example, attaching a magnetic material 6, such as stainless steel, to a center portion of a bottom of a frying pan formed of a non-magnetic material, such as aluminum. The magnetic material 6 is attached to the non-magnetic material by any method, such as sticking, welding, thermal spraying, pressure bonding, fitting, clinching, or embedding, for example.

In the typical heating target 5 formed of a composite, the magnetic material 6 is attached to the flat center portion of the non-magnetic material-based bottom surface but the magnetic material 6 is not attached to a curved outer peripheral portion in the bottom surface. When such a heating target 5 is disposed on the heating zone, the magnetic material and the non-magnetic material are disposed above the coils. More specifically, in the load determination, the load characteristic of the coils above which the magnetic material and the non-magnetic material are disposed corresponds to a characteristic of a "composite area" between a magnetic material characteristic and a non-magnetic material characteristic as illustrated in FIG. 5.

The material of the load disposed above the coils and determined by the load determining unit 46 is a material of the load immediately above the coils. For example, in the heating target 5 formed of a composite and illustrated in FIG. 6, the magnetic material 6 is placed immediately above the inner-peripheral coil 111, and a non-magnetic material forming a base of the heating target 5 is disposed on the magnetic material 6. In this case, the load determining unit 46 determines that a load disposed above the inner-peripheral coil 111 is formed of a magnetic material.

Next, the controller 45 controls the drive circuits 50a to 50c according to the result of the load determining process to perform a heating operation in which high-frequency power is supplied according to the heating power at which induction heating is performed.

Hereinafter, a heating operation performed in a case where the heating target 5 formed of a composite is disposed on the heating zone of the induction cooker 100, and a heating operation performed in a case where the heating target 5 formed only of a magnetic material is disposed on the heating zone of the induction cooker 100 will be described separately.

<Heating Target 5 Formed of Composite>

Figure 7:
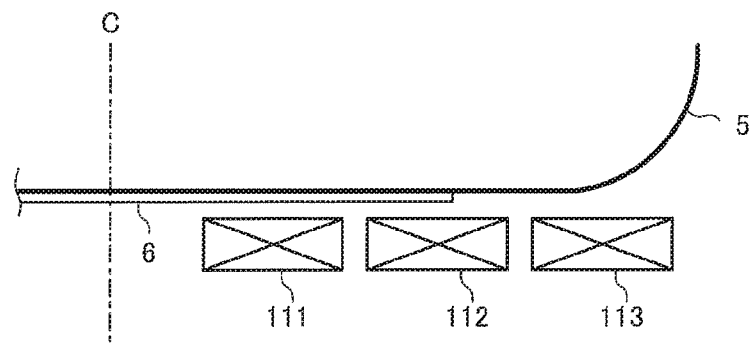
FIG. 7 is a diagram illustrating a heating target and heating coils of the induction cooker according to Embodiment 1.

FIG. 7 is a diagram illustrating the heating target and the heating coils of the induction cooker according to Embodiment 1. FIG. 7 schematically illustrates a longitudinal section of a state in which the heating target 5 formed of a composite is disposed on the heating zone. FIG. 7 illustrates the inner-peripheral coil 111, the intermediate coil 112, and the outer-peripheral coil 113 only on the right side from the center C, and does not illustrate the top plate 4.

As illustrated in FIG. 7, when the heating target 5 formed of a composite is disposed on the heating zone of the induction cooker 100, the load determining unit 46 determines that the magnetic material 6 is disposed above the inner-peripheral coil 111. Furthermore, the load determining unit 46 determines that the magnetic material 6 is disposed above a part of the intermediate coil 112 and a non-magnetic material is disposed above another part of the intermediate coil 112. More specifically, the load determining unit 46 determines that the heating target 5 disposed above the intermediate coil 112 is formed of a composite containing a magnetic material and a non-magnetic material. The load determining unit 46 also determines that a non-magnetic material is disposed above the outer-peripheral coil 113.

When the heating target 5 disposed above the inner-peripheral coil 111 is formed of a magnetic material, the heating target 5 disposed above the intermediate coil 112 is formed of a material containing a magnetic material and a non-magnetic material, and a non-magnetic material is disposed above the outer-peripheral coil 113, the controller 45 performs the following operation. The controller 45 stops the operation of the drive circuit 50*a*, and causes the drive circuits 50*b* and 50*c* to operate. More specifically, the controller 45 stops supply of a high-frequency current to the inner-peripheral coil 111, and supplies a high-frequency current to the intermediate coil 112 and the outer-peripheral coil 113.

Furthermore, the controller 45 sets a frequency of a high-frequency current to be supplied to the outer-peripheral coil 113 from the drive circuit 50*c* to be higher than a frequency of a high-frequency current to be supplied to the intermediate coil 112 from the drive circuit 50*b*. For example, the controller 45 sets the frequency of the high-frequency current to be supplied to the outer-peripheral coil 113 from the drive circuit 50*c* at a frequency set based on the non-magnetic material, for example, 90 kHz. The controller 45 also sets the frequency of the high-frequency current to be supplied to the intermediate coil 112 from the drive circuit 50*b* at a frequency previously set based on the magnetic material, for example, 25 kHz.

The controller 45 controls the heating power (electric power) by changing the on duty (on/off ratio) of the switching element of the inverter circuit 23. Thereby, the heating target 5 placed on the top plate 4 is inductively heated.

The reason why the frequency of the high-frequency current to be supplied to the outer-peripheral coil 113 from the drive circuit 50*c* is set to be higher than the frequency of the high-frequency current to be supplied to the intermediate coil 112 is as follows.

More specifically, to inductively heat a non-magnetic material formed of aluminum or the like, it is necessary to reduce the skin depth of an eddy current to be generated in the heating target 5 to reduce a penetration volume, thus increasing an impedance of a current. Therefore, a high-frequency current (for example, 80 kHz or more and 100 kHz or less) is supplied to the outer-peripheral coil 113 above which a non-magnetic material is disposed to generate a high frequency eddy current in the non-magnetic material and hence, the heating target 5 can be heated by joule heat.

Whereas, a magnetic material formed of iron or the like has a large impedance to an eddy current. Therefore, even if a current at a frequency (for example, 20 kHz or more and 35 kHz or less) lower than the frequency of the high-frequency current to be supplied to the outer-peripheral coil 113 is supplied to the intermediate coil 112 above which a composite containing a magnetic material and a non-magnetic material is disposed, the heating target 5 can be sufficiently heated by joule heat caused by an eddy current.

When a plurality of coils adjacent to each other are driven at the same time, interference noise may be generated, the interference noise corresponding to a difference in driving frequency between the coils. To prevent such interference noise, the controller 45 may set the driving frequency of the drive circuit 50*c* for the outer-peripheral coil 113 to be higher than the driving frequency of the drive circuit 50*b* for the intermediate coil 112 by not less than the audible frequency (i.e., by not less than about 20 kHz). For example, when the driving frequency of the drive circuit 50*c* for the outer-peripheral coil 113 is varied within a preset range besides the above-mentioned control based on a variation in on duty, the lower limit of the driving frequency of the drive circuit 50*c* for the outer-peripheral coil 113 is set to be higher than the upper limit of the driving frequency of the drive circuit 50*c* for the intermediate coil 112 by 20 kHz. It should be noted that the maximum driving frequency of the outer-peripheral coil 113 is, for example, 100 kHz.

Thereby, the interference noise can be prevented from being generated when the intermediate coil 112 and the outer-peripheral coil 113, which are adjacent to each other, are driven at the same time.

<Heating Target 5 Formed of Magnetic Material>

Figure 8:
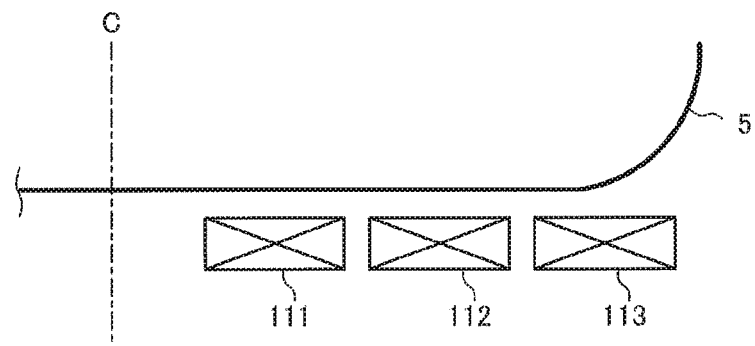
FIG. 8 is a diagram illustrating a heating target and heating coils of the induction cooker according to Embodiment 1.

FIG. 8 is a diagram illustrating the heating target and the heating coils of the induction cooker according to Embodiment 1. FIG. 8 schematically illustrates a longitudinal section of a state in which the heating target 5 formed only of a magnetic material is disposed on the heating zone. FIG. 8 illustrates the inner-peripheral coil 111, the intermediate coil 112, and the outer-peripheral coil 113 only on the right side from the center C, and does not illustrate the top plate 4.

As illustrated in FIG. 8, when the heating target 5 formed only of a magnetic material is disposed on the heating zone of the induction cooker 100, the load determining unit 46 determines that the magnetic material is disposed above the inner-peripheral coil 111, the intermediate coil 112, and the outer-peripheral coil 113.

When the heating target 5 disposed above the inner-peripheral coil 111, the intermediate coil 112, and the outer-peripheral coil 113 is formed of a magnetic material, the controller 45 performs the following operation. The controller 45 causes the drive circuits 50*a* and 50*c* to operate, and stops the operation of the drive circuit 50*b*. More specifically, the controller 45 supplies a high-frequency current to the inner-peripheral coil 111 and the outer-peripheral coil 113, and stops supply of the high-frequency current to the intermediate coil 112.

Furthermore, the controller 45 sets the frequency of the high-frequency current to be supplied to the inner-peripheral coil 111 from the drive circuit 50*a*, and the frequency of the high-frequency current to be supplied to the outer-peripheral coil 113 from the drive circuit 50*c* at a frequency previously set based on the magnetic material, for example, 25 kHz.

The controller 45 controls heating power (electric power) by changing the on duty (on/off ratio) of the switching element of the inverter circuit 23. Thereby, the heating target 5 placed on the top plate 4 is inductively heated.

When the load determining unit 46 determines that there is no load, the controller 45 stops the operation of the drive circuit 50 that drives one of the heating coils determined to have no load disposed thereabove.

The description will be made now as to the reason for performing the above-mentioned operation of the drive circuit 50 depending on the material of the heating target 5.

When the heating target 5 is inductively heated by a plurality of coils, the magnitude of an eddy current per unit area to be generated in the heating target 5 depends on the area of the coil as viewed in a plan view and a coil current flowing through the coil.

For example, when the same high-frequency current is supplied to the inner-peripheral coil 111 and the intermediate coil 112, since the area of the inner-peripheral coil 111 as viewed in a plan view is smaller than the area of the intermediate coil 112 as viewed in a plan view, an eddy current per unit area to be generated in the heating target 5 immediately above the inner-peripheral coil 111 is larger than an eddy current per unit area to be generated in the heating target 5 immediately above the intermediate coil 112.

More specifically, when the same high-frequency current is supplied to the inner-peripheral coil 111 and the intermediate coil 112, a physical phenomenon occurs where the density of electric power to be generated in the heating target 5 immediately above the inner-peripheral coil 111 is larger than the density of electric power to be generated in the heating target 5 immediately above the intermediate coil 112.

The density of electric power refers to the ratio of electric power per unit area of the coil as viewed in a plan view.

Furthermore, when the same high-frequency current is supplied to the intermediate coil 112 and the outer-peripheral coil 113, since the area of the intermediate coil 112 as viewed in a plan view is smaller than the area of the outer-peripheral coil 113 as viewed in a plan view, an eddy current per unit area to be generated in the heating target 5 immediately above the intermediate coil 112 is larger than an eddy current per unit area to be generated in the heating target 5 immediately above the outer-peripheral coil 113.

More specifically, when the same high-frequency current is supplied to the intermediate coil 112 and the outer-peripheral coil 113, a physical phenomenon occurs in which the density of electric power to be generated in the heating target 5 immediately above the intermediate coil 112 is larger than the density of electric power to be generated in the heating target 5 immediately above the outer-peripheral coil 113.

Furthermore, the heat capacity of the heating target 5 changes depending on the material of the heating target 5. For example, the heat capacity of a magnetic material, such as iron or SUS 430, is larger than a heat capacity of a non-magnetic material, such as aluminum or copper.

Therefore, to suppress unevenness in heating temperature when the heating target 5 is inductively heated, it is necessary to control heating according to the density of electric power to be input to the heating target 5 from each coil and the heat capacity of the heating target 5.

In the case where the heating target 5 is formed only of a magnetic material having a larger heat capacity, when all of the inner-peripheral coil 111, the intermediate coil 112, and the outer-peripheral coil 113 are driven, the following phenomenon occurs. More specifically, the amount of increase in temperature on the inner peripheral side having a large electric power density is larger than the amount of increase in temperature on the outer peripheral side having a small electric power density. Furthermore, since the heating target 5 has a large heat capacity, heat is hard to be transferred to the entire heating target 5, and the temperature of the heating target 5 on the outer peripheral side does not follow the temperature of the heating target 5 on the inner peripheral side, resulting in unevenness in heating temperature between the inner peripheral side and the outer peripheral side.

To suppress such unevenness in heating temperature between the inner peripheral side and the outer peripheral side of the heating target 5 formed of a magnetic material, when the heating target 5 is formed only of a magnetic material, the driving of the intermediate coil 112 is stopped, and heat to be generated due to the driving of the inner-peripheral coil 111 is transferred to the area of the intermediate coil 112. More specifically, heat to be generated due to the driving of the inner-peripheral coil 111 and the driving of the outer-peripheral coil 113 is dispersed to the area of the intermediate coil 112.

With such a configuration, a difference in temperature between the inner peripheral side (center portion) and the outer peripheral side of the heating target 5 formed of a magnetic material can be reduced. More specifically, the driving of the intermediate coil 112 is stopped to avoid an excessive increase in temperature of the center portion of the heating target 5 formed of a magnetic material caused by driving the inner-peripheral coil 111 and the intermediate coil 112, so that the heating temperature of the heating target 5 can be made uniform.

The inner-peripheral coil 111 has a large electric power density. Accordingly, for example, when the driving of the inner-peripheral coil 111 is stopped and the intermediate coil 112 is driven, the temperature of the center portion is hard to increase, resulting in unevenness in heating temperature.

Whereas, in the case where the heating target 5 is formed of a composite of a non-magnetic material having a small heat capacity with a magnetic material attached thereto, when all of the inner-peripheral coil 111, the intermediate coil 112, and the outer-peripheral coil 113 are driven, the following phenomenon occurs. More specifically, the amount of increase in temperature on the inner peripheral side having a large electric power density is larger than the amount of increase in temperature on the outer peripheral side having a small electric power density. Furthermore, since a non-magnetic material forming a base of the heating target 5 has a small heat capacity, the heating target 5 easily generates heat locally. Therefore, the temperature of the heating target 5 on the inner peripheral side increases more than the temperature of the heating target 5 on the outer peripheral side, resulting in unevenness in heating temperature between the inner peripheral side and the outer peripheral side.

To suppress such unevenness in heating temperature between the inner peripheral side and the outer peripheral side of the heating target 5 formed of a composite, when the heating target 5 is formed of a composite, the driving of the inner-peripheral coil 111 is stopped, and heat to be generated due to the driving of the intermediate coil 112 is transferred to the area of the inner-peripheral coil 111. More specifically, heat to be generated due to the driving of the intermediate coil 112 is dispersed to the area of the inner-peripheral coil 111.

With such a configuration, a difference in temperature between the inner peripheral side (center portion) and the outer peripheral side of the heating target 5 can be reduced. More specifically, the driving of the inner-peripheral coil 111 is stopped to avoid an excessive increase in temperature of the center portion of the heating target 5 formed of a composite caused by driving the inner-peripheral coil 111 and the intermediate coil 112, so that the heating temperature of the heating target 5 can be made uniform.

For example, when the driving of the intermediate coil 112 is stopped and the inner-peripheral coil 111 is driven, since the inner-peripheral coil 111 has a large electric power density, the temperature of the center portion easily increases, resulting in unevenness in heating temperature.

As described above, in Embodiment 1, when the heating target 5 disposed above the inner-peripheral coil 111 is formed of a magnetic material, the heating target 5 disposed above the intermediate coil 112 is formed of a composite containing a magnetic material and a non-magnetic material, and the heating target 5 disposed above the outer-peripheral coil 113 is formed of a material containing a non-magnetic material, the controller 45 performs the following operation.

More specifically, the controller 45 stops the operation of the drive circuit 50a, and causes the drive circuit 50b and the drive circuit 50c to operate. Furthermore, the controller 45 sets the frequency of the high-frequency current to be supplied to the outer-peripheral coil 113 from the drive circuit 50c to be higher than the frequency of the high-frequency current to be supplied to the intermediate coil 112 from the drive circuit 50b.

Therefore, when the heating target 5 formed of a composite is inductively heated, it is possible to perform the induction heating suitable for the material of the heating target 5, and thus unevenness in heating temperature can be suppressed.

In Embodiment 1, when the heating target 5 disposed above the inner-peripheral coil 111, the intermediate coil 112, and the outer-peripheral coil 113 is formed of a magnetic material, the controller 45 causes the drive circuit 50a and the drive circuit 50c to operate, and stops the operation of the drive circuit 50b.

Therefore, when the heating target 5 formed of a magnetic material is inductively heated, it is possible to perform the induction heating suitable for the material of the heating target 5, and thus unevenness in heating temperature can be suppressed.

(Modification)

Figure 9:
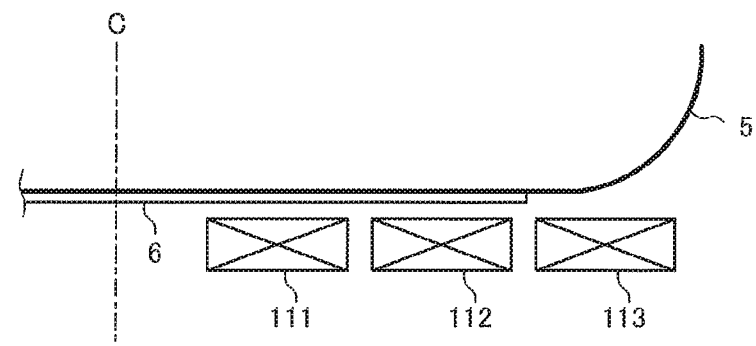
FIG. 9 is a diagram illustrating a modification of the heating target and the heating coils of the induction cooker according to Embodiment 1.

FIG. 9 is a diagram illustrating a modification of the heating target and the heating coils of the induction cooker according to Embodiment 1. FIG. 9 schematically illustrates a longitudinal section of a state in which the heating target 5 formed of a composite is disposed on the heating zone. FIG. 9 illustrates the inner-peripheral coil 111, the intermediate coil 112, and the outer-peripheral coil 113 only on the right side from the center C, and does not illustrate the top plate 4.

As illustrated in FIG. 9, when the magnetic material 6 of the heating target 5 formed of a composite is disposed above the entirety of the inner-peripheral coil 111 and the intermediate coil 112, more specifically, when the edge portion of the magnetic material 6 is positioned between the intermediate coil 112 and the outer-peripheral coil 113, the controller 45 performs the following operation.

The load determining unit 46 of the controller 45 determines that the magnetic material 6 is disposed above the inner-peripheral coil 111 and the intermediate coil 112. The load determining unit 46 also determines that a non-magnetic material is to be placed above the outer-peripheral coil 113.

When the heating target 5 disposed above the inner-peripheral coil 111 is formed of a magnetic material, the heating target 5 disposed above the intermediate coil 112 is formed of a magnetic material, and a non-magnetic material is disposed above the outer-peripheral coil 113, the controller 45 performs the following operation. The controller 45 stops the operation of the drive circuit 50a, and causes the drive circuits 50b and 50c to operate. More specifically, the controller 45 stops the supply of a high-frequency current to the inner-peripheral coil 111, and supplies a high-frequency current to the intermediate coil 112 and the outer-peripheral coil 113.

Furthermore, the controller 45 sets the frequency of the high-frequency current to be supplied to the outer-peripheral coil 113 from the drive circuit 50c to be higher than the frequency of the high-frequency current to be supplied to the intermediate coil 112 from the drive circuit 50b. For example, the controller 45 sets the frequency of the high-frequency current to be supplied to the outer-peripheral coil 113 from the drive circuit 50c at a frequency set based on a non-magnetic material, for example, 90 kHz. The controller 45 also sets the frequency of the high-frequency current to be supplied to the intermediate coil 112 from the drive circuit 50b at a frequency previously set based on a magnetic material, for example, 25 kHz.

The controller 45 controls heating power (electric power) by changing the on duty (on/off ratio) of the switching element of the inverter circuit 23. Thereby, the heating target 5 placed on the top plate 4 is inductively heated.

When the heating target 5 formed of a composite is inductively heated, it is possible to perform the induction heating suitable for the material of the heating target 5, and thus unevenness in heating temperature can be suppressed also in such an operation.

Embodiment 2

In Embodiment 2, the description will be made as to a preheating mode where, in a state where food to be cooked or the like is not inserted in the heating target 5, the temperature of the heating target 5 is increased to a temperature previously set. Components identical to the components in the above-mentioned Embodiment 1 are given the same reference symbols, and the description of such components is omitted.

Figure 10:
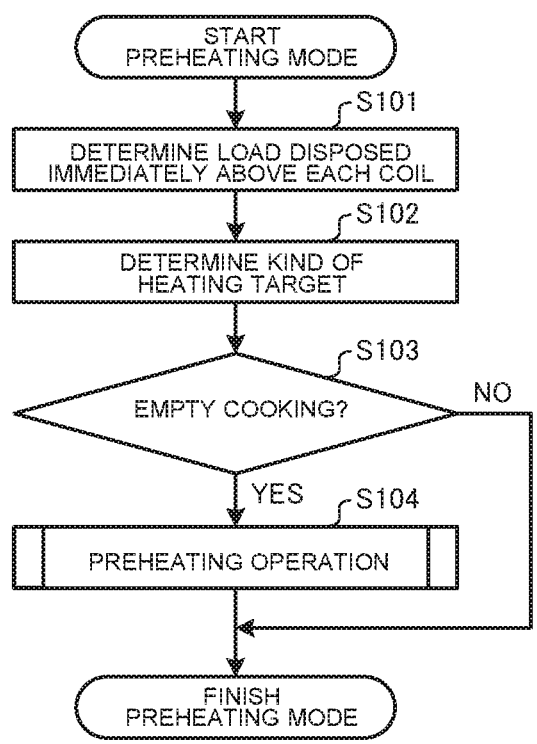
FIG. 10 is a flowchart illustrating the operation of an induction cooker according to Embodiment 2 in a preheating mode.

FIG. 10 is a flowchart illustrating the operation of an induction cooker according to Embodiment 2 in the preheating mode.

Figure 11:
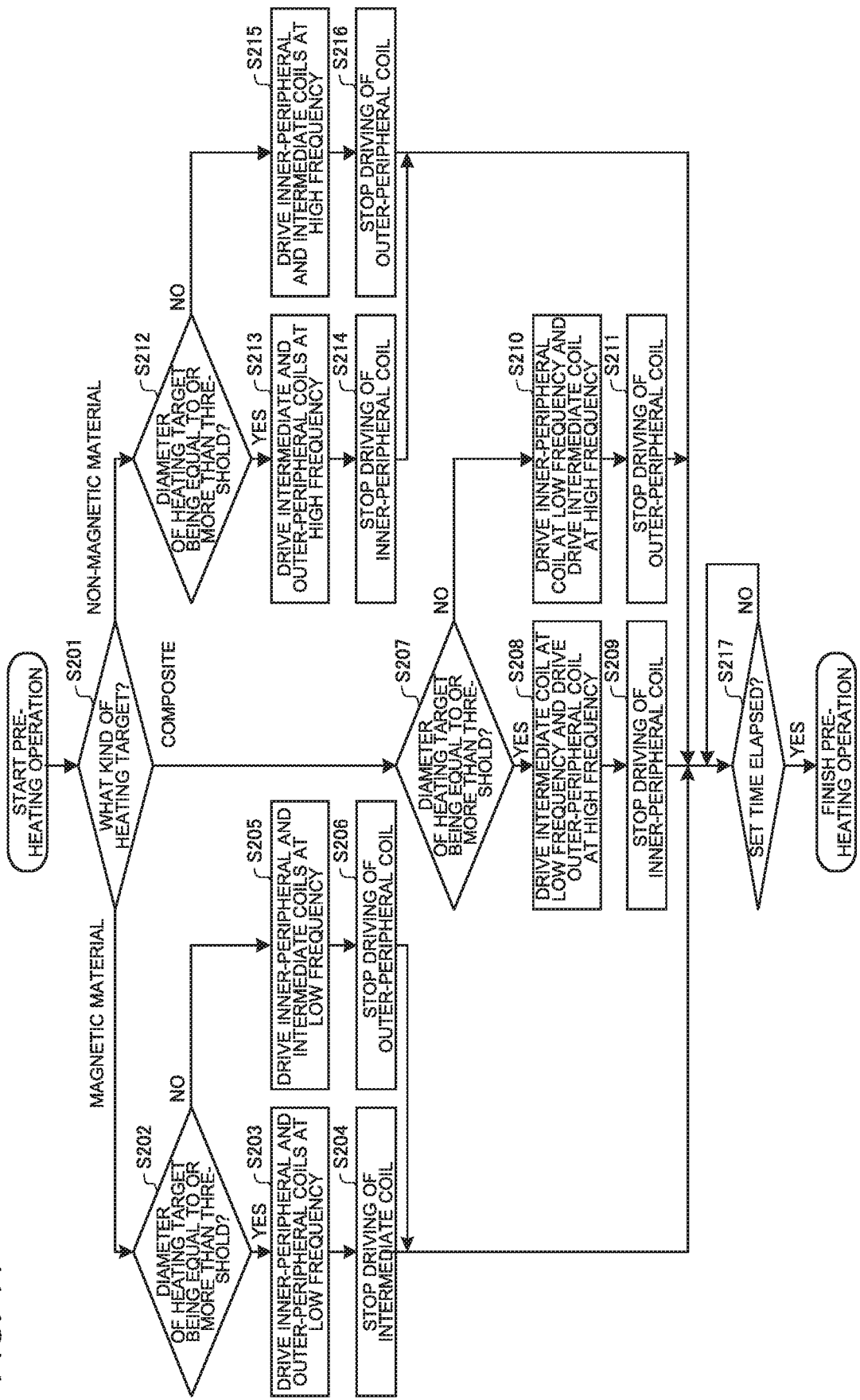
FIG. 11 is a flowchart illustrating a preheating operation of the induction cooker according to Embodiment 2 in the preheating mode.

FIG. 11 is a flowchart illustrating a preheating operation of the induction cooker according to Embodiment 2 in the preheating mode.

Hereinafter, the description will be made as to the operation in the preheating mode based on respective steps illustrated in FIG. 10 and FIG. 11.

When the user disposes the heating target 5 on one of the heating zones, and issues an instruction to start the preheating mode via the operation and display unit 43, the controller 45 starts the operation of the preheating mode. The load determining unit 46 of the controller 45 performs a load determining process that determines a load placed immediately above each coil (step S101). The load determining process is performed by the load determining unit 46 based on the relationship between the coil current and the input current described in the above-mentioned Embodiment 1, for example.

The controller 45 determines, based on the determination results of the load determining unit 46, whether the heating target 5 placed on the heating zone is formed of a magnetic material, a composite, or a non-magnetic material (step S102).

Specifically, when the load determining unit 46 determines that a magnetic material is disposed above the inner-peripheral coil 111, a composite containing a magnetic material and a non-magnetic material is disposed above the intermediate coil 112, and a non-magnetic material is disposed above the outer-peripheral coil 113, the controller 45 determines that the heating target 5 is formed of a composite.

When the load determining unit 46 determines that a magnetic material is disposed above the inner-peripheral coil 111, the intermediate coil 112, and the outer-peripheral coil 113, the controller 45 determines that the heating target 5 is formed of a magnetic material.

When the load determining unit 46 determines that a non-magnetic material is disposed above the inner-peripheral coil 111, the intermediate coil 112, and the outer-peripheral coil 113, the controller 45 determines that the heating target 5 is formed of a non-magnetic material.

Next, the controller 45 determines whether or not empty cooking is performed where food to be cooked is not inserted in the heating target 5 placed on the heating zone (step S103). Specifically, the controller 45 detects the temperature of the heating target 5 by a temperature sensor not illustrated in the drawing, and determines whether or not empty cooking is performed based on the value of increase in temperature when electric power previously set is input for a predetermined time. It should be noted that the operation for determining whether or not empty cooking is performed is not limited to such an operation.

When the controller 45 determines that empty cooking is not performed in step S103, the controller 45 finishes the preheating mode. More specifically, when food to be cooked or the like is inserted in the heating target 5, the controller 45 finishes the preheating mode. After the controller 45 finishes the preheating mode, the controller 45 shifts the mode to a normal heating mode.

Whereas, when the controller 45 determines that empty cooking is performed in step S103, the process advances to step S104 where a preheating operation is performed. The preheating operation is illustrated in FIG. 11 in detail.

The operation in step S103 may be omitted, and the preheating operation may be started in response to the operation via the operation and display unit 43.

The controller 45 performs the following operation based on the result of the determination of the kind of heating target 5 obtained in step S102.

(Magnetic Material)

When the result of the determination of the kind of heating target 5 is a magnetic material in step S201, the process advances to step S202.

In step S202, the controller 45 determines whether or not the diameter of the heating target 5 is equal to or more than the threshold. Specifically, when the inner-peripheral coil 111, the intermediate coil 112, and the outer-peripheral coil 113 have a load, the controller 45 determines that the diameter of the heating target 5 is equal to or more than the threshold. Furthermore, when the outer-peripheral coil 113 has no load, and the inner-peripheral coil 111 and the intermediate coil 112 have a load, the controller 45 determines that the diameter of the heating target 5 is not equal to or more than the threshold.

When the controller 45 determines that the diameter of the heating target 5 is equal to or more than the threshold in step S202, the controller 45 drives the drive circuit 50*a* for the inner-peripheral coil 111 and the drive circuit 50*c* for the outer-peripheral coil 113 at a low frequency of 20 kHz or more and 35 kHz or less, for example (step S203). Furthermore, the controller 45 stops the operation of the drive circuit 50*b* for the intermediate coil 112 (step S204). The details of the operations in step S203 and step S204 are as described in the above-mentioned Embodiment 1.

When the controller 45 determines that the diameter of the heating target 5 is not equal to or more than the threshold in step S202, the controller 45 drives the drive circuit 50*a* for the inner-peripheral coil 111 and the drive circuit 50*b* for the intermediate coil 112 at a low frequency of 20 kHz or more and 35 kHz or less, for example (step S205). Furthermore, the controller 45 stops the operation of the drive circuit 50*c* for the outer-peripheral coil 113 (step S206). More specifically, the driving of the outer-peripheral coil 113 in a no-load state is stopped, and the heating target 5 is inductively heated by the inner-peripheral coil 111 and the intermediate coil 112 above which a load formed of a magnetic material is disposed.

(Composite)

When the result of the determination of the kind of heating target 5 is a composite in step S201, the process advances to step S207.

In step S207, the controller 45 determines whether or not the diameter of the heating target 5 is equal to or more than the threshold. Specifically, when the inner-peripheral coil 111, the intermediate coil 112, and the outer-peripheral coil 113 have a load, the controller 45 determines that the diameter of the heating target 5 is equal to or more than the threshold. Furthermore, when the outer-peripheral coil 113 has no load, and the inner-peripheral coil 111 and the intermediate coil 112 have a load, the controller 45 determines that the diameter of the heating target 5 is not equal to or more than the threshold.

When the controller 45 determines that the diameter of the heating target 5 is equal to or more than the threshold in step S207, the controller 45 drives the drive circuit 50*b* for the intermediate coil 112 at a low frequency of 20 kHz or more and 35 kHz or less, for example. The controller 45 also drives the drive circuit 50*c* for the outer-peripheral coil 113 at a high frequency of 80 kHz or more and 100 kHz or less, for example (step S208). Furthermore, the controller 45 stops the operation of the drive circuit 50*a* for the inner-peripheral coil 111 (step S209). The details of the operations in step S208 and step S209 are as described in the above-mentioned Embodiment 1.

When the controller 45 determines that the diameter of the heating target 5 is not equal to or more than the threshold in step S207, the controller 45 drives the drive circuit 50*a* for the inner-peripheral coil 111 at a low frequency of 20 kHz to 35 kHz, for example. The controller 45 also drives the drive circuit 50*b* for the intermediate coil 112 at a high frequency of 80 kHz or more and 100 kHz or less, for example (step S210). Furthermore, the controller 45 stops the operation of the drive circuit 50*c* for the outer-peripheral coil 113 (step S211). More specifically, the driving of the outer-peripheral coil 113 in a no-load state is stopped, and the heating target 5 is inductively heated by the inner-peripheral coil 111 and the intermediate coil 112 above which a load formed of a magnetic material and a composite is disposed.

By setting a frequency range of low frequency and a frequency range of high frequency as described above, the lower limit of the driving frequency of the drive circuit 50*c* for the outer-peripheral coil 113 can be set to be higher than the upper limit of the driving frequency of the drive circuit 50*c* for the intermediate coil 112 by not less than the audible frequency (20 kHz or more).

With such a configuration, the interference noise can be prevented from being generated when the intermediate coil 112 and the outer-peripheral coil 113, which are adjacent to each other, are driven at the same time.

(Non-Magnetic Material)

When the result of the determination of the kind of heating target 5 is a non-magnetic material in step S201, the process advances to step S212.

In step S212, the controller 45 determines whether or not the diameter of the heating target 5 is equal to or more than the threshold. Specifically, when the inner-peripheral coil 111, the intermediate coil 112, and the outer-peripheral coil 113 have a load, the controller 45 determines that the diameter of the heating target 5 is equal to or more than the threshold. Furthermore, when the outer-peripheral coil 113 has no load, and the inner-peripheral coil 111 and the intermediate coil 112 have a load, the controller 45 determines that the diameter of the heating target 5 is not equal to or more than the threshold.

When the controller 45 determines that the diameter of the heating target 5 is equal to or more than the threshold in step S212, the controller 45 drives the drive circuit 50*b* for the intermediate coil 112 and the drive circuit 50*c* for the outer-peripheral coil 113 at a high frequency suitable for a non-magnetic material (step S213). The high frequency suitable for a non-magnetic material is a frequency of 80 kHz or more and 100 kHz or less, for example. Furthermore, the controller 45 stops the operation of the drive circuit 50*a* for the inner-peripheral coil 111 (step S214).

In the case where the heating target 5 is formed only of a non-magnetic material having a small heat capacity, when all of the inner-peripheral coil 111, the intermediate coil 112, and the outer-peripheral coil 113 are driven, the following phenomenon occurs. More specifically, the amount of increase in temperature on the inner peripheral side having a large electric power density is larger than the amount of increase in temperature on the outer peripheral side having a small electric power density. Furthermore, a non-magnetic material has a small heat capacity and hence, the heating target 5 easily generates heat locally. Therefore, the temperature of the heating target 5 on the inner peripheral side increases more than the temperature of the heating target 5 on the outer peripheral side, resulting in unevenness in heating temperature between the inner peripheral side and the outer peripheral side.

To suppress such unevenness in heating temperature between the inner peripheral side and the outer peripheral side of the heating target 5 formed of a non-magnetic material, when the heating target 5 is formed only of a non-magnetic material, the driving of the inner-peripheral coil 111 is stopped, and heat to be generated due to the driving of the intermediate coil 112 is transferred to the area of the inner-peripheral coil 111. More specifically, heat to be generated due to the driving of the intermediate coil 112 is dispersed to the area of the inner-peripheral coil 111.

When the controller 45 determines that the diameter of the heating target 5 is not equal to or more than the threshold in step S212, the controller 45 drives the drive circuit 50*a* for the inner-peripheral coil 111 and the drive circuit 50*b* for the intermediate coil 112 at a high frequency suitable for a non-magnetic material (step S215). The high frequency suitable for a non-magnetic material is a frequency of 80 kHz or more and 100 kHz or less, for example. Furthermore, the controller 45 stops the operation of the drive circuit 50*c* for the outer-peripheral coil 113 (step S216). More specifically, the driving of the outer-peripheral coil 113 in a no-load state is stopped, and the heating target 5 is inductively heated by the inner-peripheral coil 111 and the intermediate coil 112 above which a load formed of a non-magnetic material is disposed.

Next, the controller 45 determines whether or not the elapsed time from the start of the preheating operation exceeds a set time (step S217). In this embodiment, the set time may be a value previously set, or may be set to a value input by the user via the operation and display unit 43.

When the elapsed time from the start of the preheating operation exceeds the set time in step S217, the preheating operation is finished, and the mode is shifted from the preheating mode to the normal heating mode.

In the normal heating mode, the controller 45 drives, of the respective coils, the coil over which a load is disposed, and performs a heating operation that corresponds to set heating power or the like input via the operation and display unit 43.

As described above, in Embodiment 2, each of the respective coils is brought into a driving state according to the kind of heating target 5 in the preheating mode and hence, it is possible to suppress unevenness in heating temperature regardless of the kind of heating target 5. More specifically, in either the case where the heating target 5 is formed of a magnetic material having a large heat capacity or the case where the heating target 5 is formed of a composite or a non-magnetic material having a small heat capacity, it is possible to suppress unevenness in heating temperature of the heating target 5 in the preheating operation.

Embodiment 3

In Embodiment 3, the description will be made as to electric power to be supplied to respective coils when the heating target 5 illustrated in FIG. 7 and formed of a composite is heated and when the heating target 5 illustrated in FIG. 8 and formed of a magnetic material is heated. Components identical to the components in the above-mentioned Embodiment 1 or 2 are given the same reference symbols, and the description of such components is omitted.

<Heating Target 5 Formed of Composite>

When the heating target 5 formed of a composite is placed on the heating zone of the induction cooker 100 as illustrated in FIG. 7, in the same manner as the above-mentioned Embodiment 1, the controller 45 stops the operation of the drive circuit 50*a*, and causes the drive circuits 50*b* and 50*c* to operate.

Furthermore, the controller 45 sets electric power to be supplied to the intermediate coil 112 from the drive circuit 50*b* and electric power to be supplied to the outer-peripheral coil 113 from the drive circuit 50*c* to be equal to each other.

In the present invention, the situation of electric powers being equal to each other is not limited to the case where the electric powers are strictly identical to each other, and includes the case where the electric powers have a margin of error caused by a margin of error in control, a margin of error in operational characteristics of components or the like. Furthermore, in the present invention, the description that electric powers are set to be equal to each other also includes the case where the electric powers are set to be substantially equal to each other.

As described above, when the heating target 5 formed of a composite is heated, the drive circuit 50*b* and the drive circuit 50*c* are driven, and electric power to be supplied to the intermediate coil 112 and electric power to be supplied to the outer-peripheral coil 113 are set to be equal to each other. With such a configuration, compared with the case where three drive circuits consisting of the drive circuits 50*a* to 50*c* are driven, the temperature of the heating target 5 formed of a composite can be increased more rapidly, and unevenness in heating temperature can be suppressed.

For example, assume a case where an electric power of 1500 W in total is supplied to the respective coils. When the driving of the inner-peripheral coil 111 is stopped, and an electric power of 750 W is supplied to each of the intermediate coil 112 and the outer-peripheral coil 113, uniform heating can be realized more rapidly compared with the case where an electric power of 500 W is supplied to each of the inner-peripheral coil 111, the intermediate coil 112, and the outer-peripheral coil 113.

The reason is as follows. More specifically, an increase in temperature of a magnetic material (composite) disposed above the intermediate coil 112 having lower frequency than the outer-peripheral coil 113 is large than an increase in temperature of a non-magnetic material disposed above the outer-peripheral coil 113. Furthermore, as described above, the magnetic material disposed above the intermediate coil 112 is attached to a non-magnetic material forming a base of the heating target 5. Since the non-magnetic material forming the base of the heating target 5 has a small heat capacity, heat to be generated due to the driving of the intermediate coil 112 can be rapidly transferred to the area of the inner-peripheral coil 111.

Therefore, the temperature of the heating target 5 formed of a composite can be increased more rapidly, and unevenness in heating temperature can be suppressed.

<Heating Target 5 Formed of Magnetic Material>

When the heating target 5 formed only of a magnetic material is placed on the heating zone of the induction cooker 100 as illustrated in FIG. 8, in the same manner as the above-mentioned Embodiment 1, the controller 45 causes the drive circuits 50a and 50c to operate, and stops the operation of the drive circuit 50b.

Furthermore, the controller 45 sets electric power to be supplied to the outer-peripheral coil 113 from the drive circuit 50c to be larger than electric power to be supplied to the inner-peripheral coil 111 from the drive circuit 50a.

As described above, when the heating target 5 formed of a magnetic material is heated, the drive circuit 50a and the drive circuit 50c are driven, and electric power to be supplied to the outer-peripheral coil 113 is set to be larger than electric power to be supplied to the inner-peripheral coil 111. With such a configuration, compared with the case where three drive circuits consisting of the drive circuits 50a to 50c are driven, the temperature of the heating target 5 formed of a magnetic material can be increased more rapidly, and unevenness in heating temperature can be suppressed.

For example, assume a case where an electric power of 1500 W in total is supplied to the respective coils. When the driving of the intermediate coil 112 is stopped, an electric power of 500 W is supplied to the inner-peripheral coil 111, and an electric power of 1000 W is supplied to the outer-peripheral coil 113, uniform heating can be realized more rapidly compared with the case where an electric power of 300 W is supplied to the inner-peripheral coil 111, an electric power of 300 W is supplied to the intermediate coil 112, and an electric power of 900 W is supplied to the outer-peripheral coil 113.

The reason is as follows. More specifically, the area of the inner-peripheral coil 111 as viewed in a plan view is smaller than the area of the outer-peripheral coil 113 as viewed in a plan view. Therefore, when the same amount of electric power is supplied to the inner-peripheral coil 111 and the outer-peripheral coil 113, the electric power density of the inner-peripheral coil 111 is larger than the electric power density of the outer-peripheral coil 113.

In view of the above, by setting electric power to be supplied to the outer-peripheral coil 113 to be larger than electric power to be supplied to the inner-peripheral coil 111, it is possible to reduce a difference between the electric power density of the outer-peripheral coil 113 and the electric power density of the inner-peripheral coil 111. Furthermore, the driving of the intermediate coil 112 is stopped, and heat to be generated due to the driving of the inner-peripheral coil 111 and the driving of the outer-peripheral coil 113 is dispersed to the area of the intermediate coil 112 and hence, it is possible to suppress unevenness in heating temperature.

Therefore, the temperature of the heating target 5 formed of a magnetic material can be increased more rapidly, and unevenness in heating temperature can be suppressed.

(Modification)

When the heating target 5 formed only of a magnetic material is placed on the heating zone of the induction cooker 100, the controller 45 may control the driving of the drive circuits 50a and 50c such that the electric power density of the inner-peripheral coil 111 and the electric power density of the outer-peripheral coil 113 become equal to each other.

Specifically, the controller 45 previously stores the area of the inner-peripheral coil 111 as viewed in a plan view, and obtains the electric power density of the inner-peripheral coil 111 by dividing electric power to be supplied to the inner-peripheral coil 111 by the area of the inner-peripheral coil 111. The controller 45 also previously stores the area of the outer-peripheral coil 113 as viewed in a plan view, and obtains the electric power density of the outer-peripheral coil 113 by dividing electric power to be supplied to the outer-peripheral coil 113 by the area of the outer-peripheral coil 113. Then, the controller 45 controls electric power to be supplied to the inner-peripheral coil 111 and electric power to be supplied to the outer-peripheral coil 113 such that the electric power density of the inner-peripheral coil 111 and the electric power density of the outer-peripheral coil 113 become equal to each other.

Also with such operations, it is possible to reduce a difference between the electric power density of the outer-peripheral coil 113 and the electric power density of the inner-peripheral coil 111, and thus unevenness in heating temperature can be suppressed.

Instead of using values of electric power to be supplied to the respective coils, a control may be performed using a coil current value assuming that a voltage value is substantially constant. Alternatively, for example, it may be configured such that the controller 45 previously stores, in the form of a table, distribution ratios of electric power at which electric power densities become equal to each other according to the area ratio between the inner-peripheral coil 111 and the outer-peripheral coil 113, and the controller 45 sets electric power to be supplied to each coil by referring to this table.

Embodiment 4

In Embodiment 4, the description will be made as to a frequency of a high-frequency current to be supplied to the intermediate coil 112. Components identical to the components in the above-mentioned Embodiments 1 to 3 are given the same reference symbols, and the description of such components is omitted.

The controller 45 in Embodiment 4 sets a frequency of a high-frequency current to be supplied to the intermediate coil 112 from the drive circuit 50b to be higher than a frequency of a high-frequency current to be supplied to the inner-peripheral coil 111 from the drive circuit 50a, and to be lower than a frequency of a high-frequency current to be supplied to the outer-peripheral coil 113 from the drive circuit 50c.

Specifically, the controller 45 sets a frequency of a high-frequency current to be supplied to the inner-peripheral coil 111 from the drive circuit 50a at a low frequency of 20 kHz or more and 35 kHz or less, for example. The controller 45 sets a frequency of a high-frequency current to be supplied to the intermediate coil 112 from the drive circuit 50b at an intermediate frequency of 55 kHz or more and 60 kHz or less, for example. Furthermore, the controller 45 sets a frequency of a high-frequency current to be supplied to the outer-peripheral coil 113 from the drive circuit 50c at a high frequency of 80 kHz or more and 100 kHz or less, for example.

The reason for adopting the intermediate frequency will be described. The intermediate frequency is adopted for induction heating of the area of a composite of a magnetic material and a non-magnetic material in the heating target 5 formed of a composite. More specifically, the intermediate frequency is adopted for induction heating of a boundary area between a magnetic material, such as iron, and a non-magnetic material, such as aluminum, in the heating target 5 formed of a composite.

To inductively heat a non-magnetic material, such as aluminum, it is necessary to generate a high-frequency current (80 kHz or more and 100 kHz or less) to reduce the skin depth of an eddy current to be generated in the non-magnetic material to reduce a penetration volume, thus increasing an impedance of a current. With the generation of such a high frequency eddy current, the bottom of a pot can be heated by joule heat.

Whereas, a magnetic material has a large impedance to an eddy current, so that even when driving at a low frequency (20 kHz or more and 35 kHz or less) is adopted, the magnetic material can be sufficiently heated by joule heat caused by a low frequency eddy current.

As illustrated in FIG. 5, in the heating target 5 formed of a composite of a magnetic material and a non-magnetic material, the area of the composite (i.e., composite area) has electrical characteristics intermediate between electrical characteristics of a magnetic material and electrical characteristics of a non-magnetic material. Therefore, the skin depth of an eddy current at an energizing frequency is also an intermediate value between the skin depth of an eddy current in a magnetic material and the skin depth of an eddy current in a non-magnetic material. For this reason, to obtain an impedance of the bottom surface of the heating target 5 to an eddy current equivalent to an impedance in a magnetic material or a non-magnetic material, it is optimal to perform energization at an intermediate frequency between a low frequency and a high frequency.

The heating target 5 formed of a composite can be inductively heated even when driving at a high frequency is adopted for the composite. In such a case, however, a loss in the inverter circuit 23 of the drive circuit 50, and conductive wires of the respective coils increases. Therefore, it is desirable to perform induction heating at a frequency as low as possible.

Furthermore, due to a high frequency, concentration of a magnetic flux generated from the coil is promoted, so that a physical phenomenon occurs where an eddy current is concentrated on the bottom surface of the heating target 5 immediately above the coil. For this reason, a lower frequency can promote uniform heating and hence, it is desirable to perform induction heating at a frequency as low as possible. Therefore, an intermediate frequency is adopted for a composite.

(Operation)

Next, the operation of the induction cooker according to Embodiment 4 will be described.

<Heating Target 5 Formed of Composite>

When the heating target 5 formed of a composite is placed on the heating zone of the induction cooker 100 as illustrated in FIG. 7, in the same manner as the above-mentioned Embodiment 1, the controller 45 stops the operation of the drive circuit 50a, and causes the drive circuits 50b and 50c to operate.

Furthermore, the controller 45 sets a frequency of a high-frequency current to be supplied to the intermediate coil 112 from the drive circuit 50b at an intermediate frequency of 55 kHz or more and 60 kHz or less, for example. The controller 45 also sets a high-frequency current to be supplied to the outer-peripheral coil 113 from the drive circuit 50c at a high frequency of 80 kHz or more and 100 kHz or less, for example.

With such operations, it is possible to suppress unevenness in heating temperature of the heating target 5 formed of a composite. Furthermore, it is possible to perform the induction heating suitable for the material of the heating target 5, thus suppressing a reduction in heating efficiency.

<Heating Target 5 Formed of Magnetic Material>

When the heating target 5 formed only of a magnetic material is placed on the heating zone of the induction cooker 100 as illustrated in FIG. 8, in the same manner as the above-mentioned Embodiment 1, the controller 45 causes the drive circuits 50a and 50c to operate, and stops the operation of the drive circuit 50b.

Furthermore, the controller 45 sets a frequency of a high-frequency current to be supplied to the inner-peripheral coil 111 from the drive circuit 50a and a frequency of a high-frequency current to be supplied to the outer-peripheral coil 113 from the drive circuit 50c at a low frequency of 20 kHz or more and 35 kHz or less, for example.

With such operations, it is possible to suppress unevenness in heating temperature of the heating target 5 formed of a magnetic material. Furthermore, it is possible to perform the induction heating suitable for the material of the heating target 5, thus suppressing a reduction in heating efficiency.

(Modification)

The controller 45 may set a frequency of a high-frequency current to be supplied to the intermediate coil 112 from the drive circuit 50b to be higher than a frequency of a high-frequency current to be supplied to the inner-peripheral coil 111 from the drive circuit 50a by not less than the audible frequency, and to be lower than a frequency of a high-frequency current to be supplied to the outer-peripheral coil 113 from the drive circuit 50c by not less than the audible frequency.

For example, as in the case of the above-mentioned specific example, the controller 45 sets a frequency of a high-frequency current to be supplied to the inner-peripheral coil 111 at a low frequency of 20 kHz or more and 35 kHz or less. The controller 45 sets a frequency of a high-frequency current to be supplied to the intermediate coil 112 at an intermediate frequency of 55 kHz or more and 60 kHz or less. Furthermore, the controller 45 sets a frequency of a high-frequency current to be supplied to the outer-peripheral coil 113 at a high frequency of 80 kHz or more and 100 kHz or less.

With such settings, a difference in frequency of a high-frequency current between the inner-peripheral coil 111, the intermediate coil 112, and the outer-peripheral coil 113 can be set to not less than the audible frequency (20 kHz) and hence, the interference noise can be prevented from being generated.

Embodiment 5

In Embodiment 5, a configuration that includes four heating coils will be described. In the description made hereinafter, components identical to the components in the above-mentioned Embodiments 1 to 4 are given the same reference symbols, and points that make Embodiment 5 different from Embodiments 1 to 4 will be mainly described.

In the description made hereinafter, the description will be made as to a configuration where the first induction heating unit 11 includes four heating coils. The second induction heating unit 12 and the third induction heating unit 13 may also have substantially the same configuration, or may have the configuration equal to any one of the configurations of the above-mentioned Embodiments 1 to 4.

(Configuration)

Figure 12:
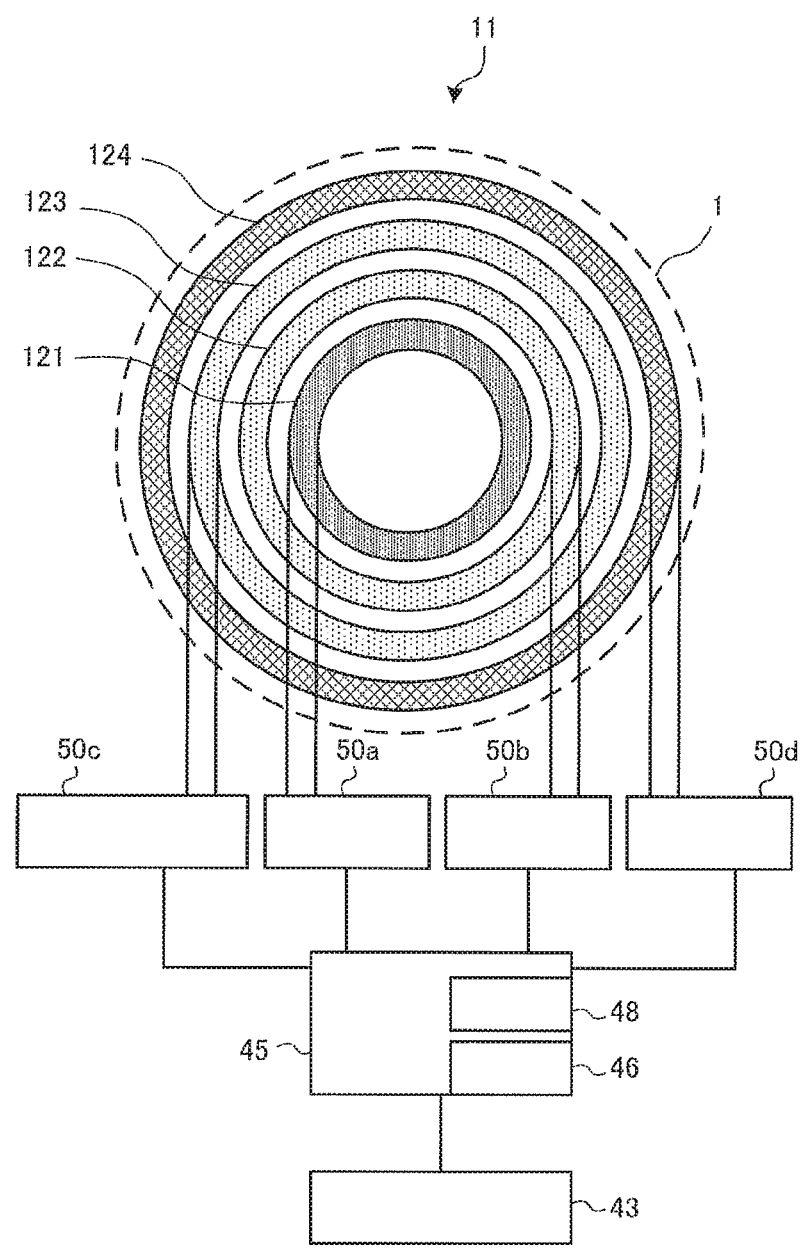
FIG. 12 is a block diagram illustrating a configuration of an induction cooker according to Embodiment 5.

FIG. 12 is a block diagram illustrating a configuration of an induction cooker according to Embodiment 5.

As illustrated in FIG. 12, the first induction heating unit 11 is made up of a plurality of ring-shaped coils that are concentrically disposed and are different from one another in diameter. The first induction heating unit 11 includes a first coil 121 disposed at the center of the first induction heating zone 1, a second coil 122 placed on the outer peripheral side of the first coil 121, a third coil 123 placed on the outer peripheral side of the second coil 122, and a fourth coil 124 placed on the outer peripheral side of the third coil 123.

Each of the first coil 121, the second coil 122, the third coil 123 and the fourth coil 124 is formed by winding a conductive wire made of insulation-coated metal. Arbitrary metal, such as copper or aluminum, for example, may be used for the conductive wire. Each of the first coil 121, the second coil 122, the third coil 123 and the fourth coil 124 is formed such that a conductive wire is independently wound.

The first coil 121 is controlled to be driven by the drive circuit 50a. The second coil 122 is controlled to be driven by the drive circuit 50b. The third coil 123 is controlled to be driven by the drive circuit 50c. The fourth coil 124 is controlled to be driven by a drive circuit 50d. The configuration of the drive circuit 50a to 50d is substantially equal to the configuration of the drive circuit 50a described in the above-mentioned Embodiment 1.

In the description made hereinafter, the first coil 121, the second coil 122, the third coil 123 and the fourth coil 124 may be collectively referred to as respective coils.

The drive circuit 50d corresponds to "fourth inverter circuit" in the present invention.

A high-frequency current to be supplied to the fourth coil 124 from the drive circuit 50d corresponds to "fourth high-frequency current" in the present invention.

Next, an example of the outer diameter of the heating target 5 and the outer diameters of the respective coils will be described.

The heating target 5, such as a pot or a frying pan, having the diameter of an opening port on the upper surface side of approximately 27 cm and the diameter of a bottom surface, forming a contact surface with the top plate 4, of approximately 24 cm, is distributed in the market as a heating target having a maximum class size. Therefore, to inductively heat the heating target 5 distributed in the market and having the maximum class size uniformly, a heating coil is required to have a diameter of approximately 24 cm.

In the case where a plurality of heating coils are disposed in a divided manner, it is necessary to provide, between the coils, a ferrite core for reducing magnetic flux interference and a gap for disposing the ferrite core. In the vicinity of the coil disposed at the center portion of the heating zone, it is also necessary to provide a gap for disposing a temperature sensor that detects the temperature of the top plate 4 or the temperature of the heating target 5.

During the determination of the material of the heating target 5 immediately above the coil for the respective coils, when the user accidentally moves the heating target 5, the result of the determination of material changes each time the heating target 5 is moved. When the result of the determination of material changes as described above, the controller 45 is required to switch the driving frequency each time the result of the determination of material changes. To switch the driving frequency, a switching operation of the resonant capacitor is performed and hence, the drive circuit 50 is required to be temporarily stopped. This means that the heating operation is temporarily stopped, leading to a drop in usability. During cooking with the induction cooker 100, it is desirable to avoid temporary stopping of the heating operation even when the placement position is displaced due to vibrations or the like of the heating target 5.

For this reason, it is desirable to set the turn width of each coil to approximately 2 cm. In this embodiment, the turn width of the coil is defined as (the outer diameter of the coil–the inner diameter of the coil)/2. More specifically, assuming that the turn width of each of four coils is 2 cm, a gap formed between the coils is 0.5 cm, a gap for disposing the temperature sensor is 2 cm, and the diameter of a gap formed on the innermost periphery is 2 cm, the coil is required to have the outermost diameter of 24 cm. That is, the four-coil structure is optimal to ensure the turn width of 2 cm.

In Embodiment 5, the turn width of each of the first coil 121, the second coil 122, the third coil 123 and the fourth coil 124 is set to 2 cm, and the outer diameter of the fourth coil 124 is set to 24 cm.

With such a configuration, it is possible to inductively heat the heating target 5 distributed in the market and having the maximum class size while unevenness in heating temperature is suppressed.

(Operation)

Figure 13:
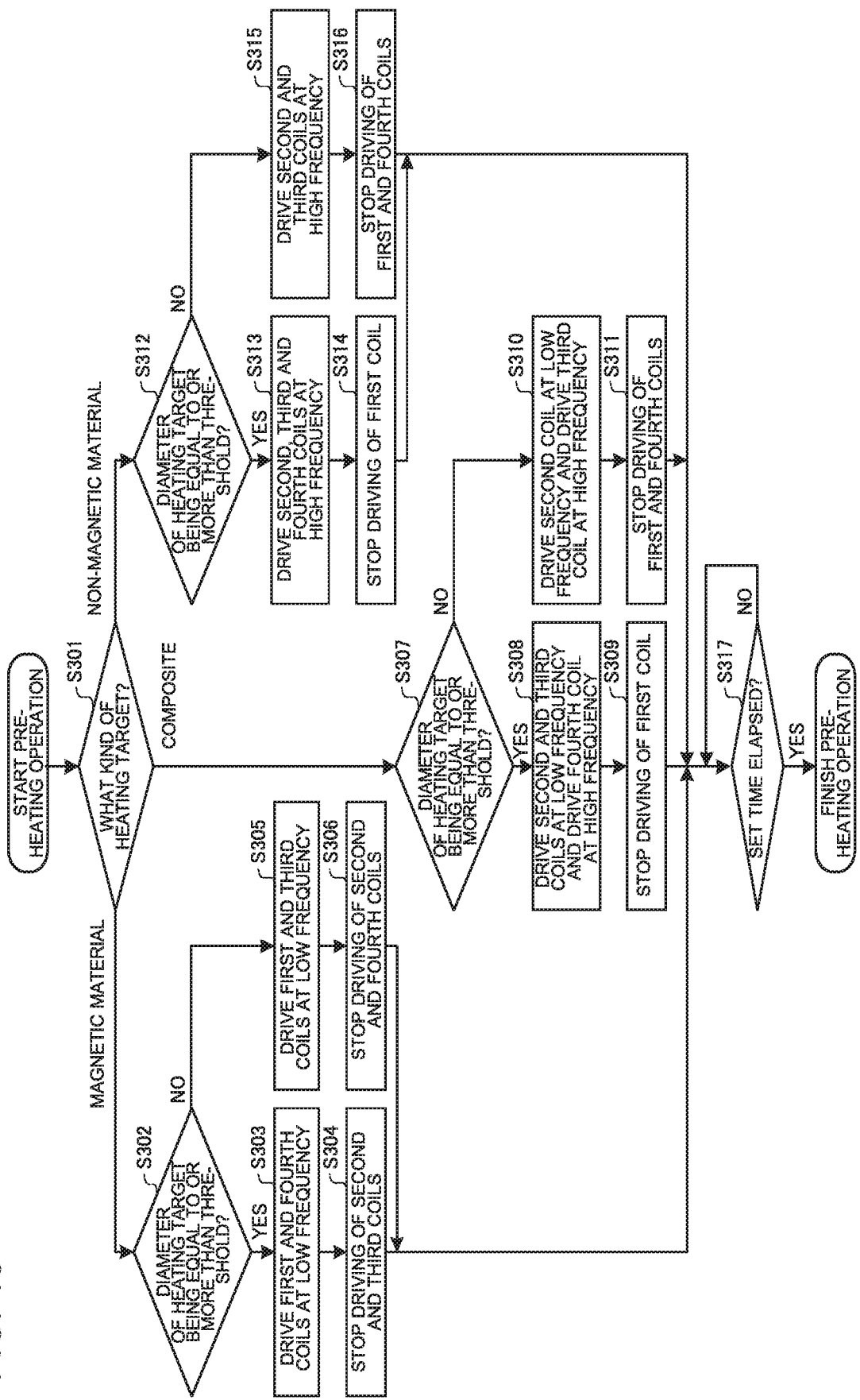
FIG. 13 is a flowchart illustrating a preheating operation of the induction cooker according to Embodiment 5 in a preheating mode.

FIG. 13 is a flowchart illustrating a preheating operation of the induction cooker according to Embodiment 5 in a preheating mode.

Hereinafter, the description will be made as to the operation in the preheating mode in Embodiment 5 based on respective steps illustrated in FIG. 13. Operations performed before the heating operation is started in the preheating mode are substantially equal to the operations in steps S101 to S103 (FIG. 10) in the above-mentioned Embodiment 2 and hence, the description of such operations is omitted.

The controller 45 determines, based on the determination results of the load determining unit 46, whether the heating target 5 placed on the heating zone is formed of a magnetic material, a composite, or a non-magnetic material (step S301).

Specifically, when the load determining unit 46 determines that a magnetic material is disposed above the first coil 121, a magnetic material or a composite is disposed above the second coil 122 and the third coil 123, and a non-magnetic material is disposed above the fourth coil 124, the controller 45 determines that the heating target 5 is formed of a composite.

When the load determining unit 46 determines that a magnetic material is disposed above the first coil 121, the second coil 122, the third coil 123, and the fourth coil 124, the controller 45 determines that the heating target 5 is formed of a magnetic material.

When the load determining unit 46 determines that a non-magnetic material is disposed above the first coil 121, the second coil 122, the third coil 123, and the fourth coil 124, the controller 45 determines that the heating target 5 is formed of a non-magnetic material.

The controller 45 performs the following operation based on the result of the determination of the kind of heating target 5 obtained in step S301.

(Magnetic Material)

When the result of the determination of the kind of heating target 5 is a magnetic material in step S301, the process advances to step S302.

In step S302, the controller 45 determines whether or not the diameter of the heating target 5 is equal to or more than the threshold. Specifically, when the first coil 121, the second coil 122, the third coil 123, and the fourth coil 124 have a load, the controller 45 determines that the diameter of the heating target 5 is equal to or more than the threshold. Furthermore, when the fourth coil 124 has no load, and the first coil 121, the second coil 122, and the third coil 123 have a load, the controller 45 determines that the diameter of the heating target 5 is not equal to or more than the threshold.

When the controller 45 determines that the diameter of the heating target 5 is equal to or more than the threshold in step S302, the controller 45 drives the drive circuit 50a for the first coil 121 and the drive circuit 50d for the fourth coil 124 at a low frequency of 20 kHz or more and 35 kHz or less, for example (step S303). Furthermore, the controller 45 stops the operation of the drive circuit 50b for the second coil 122 and the operation of the drive circuit 50c for the third coil 123 (step S304).

In step S304, only one of the drive circuit 50b for the second coil 122 and the drive circuit 50c for the third coil 123 may be stopped, and the other of the drive circuit 50b for the second coil 122 and the drive circuit 50c for the third coil 123 may be driven at a low frequency.

When the controller 45 determines that the diameter of the heating target 5 is not equal to or more than the threshold in step S302, the controller 45 drives the drive circuit 50a for the first coil 121 and the drive circuit 50c for the third coil 123 at a low frequency of 20 kHz or more and 35 kHz or less, for example (step S305). Furthermore, the controller 45 stops the operation of the drive circuit 50b for the second coil 122 and the operation of the drive circuit 50d for the fourth coil 124 (step S306). More specifically, operation substantially equal to the operation of the configuration of the three coils in the above-mentioned Embodiment 1 is performed.

(Composite)

When the result of the determination of the kind of heating target 5 is a composite in step S301, the process advances to step S307.

In step S307, the controller 45 determines whether or not the diameter of the heating target 5 is equal to or more than the threshold. The specific operation is substantially equal to the operation in step S302.

When the controller 45 determines that the diameter of the heating target 5 is equal to or more than the threshold in step S307, the controller 45 drives the drive circuit 50b for the second coil 122 and the drive circuit 50c for the third coil 123 at a low frequency of 20 kHz or more and 35 kHz or less, for example. The controller 45 also drives the drive circuit 50d for the fourth coil 124 at a high frequency of 80 kHz or more and 100 kHz or less, for example (step S308). Furthermore, the controller 45 stops the operation of the drive circuit 50a for the first coil 121 (step S309).

When the controller 45 determines that the diameter of the heating target 5 is not equal to or more than the threshold in step S307, the controller 45 drives the drive circuit 50b for the second coil 122 at a low frequency of from 20 kHz to 35 kHz, for example. The controller 45 also drives the drive circuit 50c for the third coil 123 at a high frequency of 80 kHz or more and 100 kHz or less, for example (step S310). Furthermore, the controller 45 stops the operation of the drive circuit 50a for the first coil 121 and the operation of the drive circuit 50d for the fourth coil 124 (step S311). More specifically, operation substantially equal to the operation of the configuration of the three coils in the above-mentioned Embodiment 1 is performed.

A frequency range of low frequency and a frequency range of high frequency may be set in the same manner as the above-mentioned Embodiment 2. For example, in step S308, the lower limit of the driving frequency of the drive circuit 50d for the fourth coil 124 is set to be higher than the upper limit of the driving frequency of the drive circuit 50b for the second coil 122 and the drive circuit 50c for the third coil 123 by not less than the audible frequency (20 kHz or more). Furthermore, for example, in step S310, the lower limit of the driving frequency of the drive circuit 50c for the third coil 123 is set to be higher than the upper limit of the driving frequency of the drive circuit 50b for the second coil 122 by not less than the audible frequency (20 kHz or more).

With such a configuration, the interference noise can be prevented from being generated when the second coil 122, the third coil 123, and the fourth coil 124, which are adjacent to each other, are driven at the same time or when the second coil 122 and the third coil 123 are driven at the same time.

(Non-Magnetic Material)

When the result of the determination of the kind of heating target 5 is a non-magnetic material in step S301, the process advances to step S312.

In step S312, the controller 45 determines whether or not the diameter of the heating target 5 is equal to or more than the threshold. The specific operation is substantially equal to the operation in step S302.

When the controller 45 determines that the diameter of the heating target 5 is equal to or more than the threshold in step S312, the controller 45 drives the drive circuit 50b for the second coil 122, the drive circuit 50c for the third coil 123, and the drive circuit 50d for the fourth coil 124 at a high frequency suitable for a non-magnetic material (step S313). The high frequency suitable for a non-magnetic material is a frequency of 80 kHz or more and 100 kHz or less, for example. Furthermore, the controller 45 stops the operation of the drive circuit 50a for the first coil 121 (step S314).

When the controller 45 determines that the diameter of the heating target 5 is not equal to or more than the threshold in step S312, the controller 45 drives the drive circuit 50b for the second coil 122 and the drive circuit 50c for the third coil 123 at a high frequency suitable for a non-magnetic material (step S315). The high frequency suitable for a non-magnetic material is a frequency of 80 kHz or more and 100 kHz or less, for example. Furthermore, the controller 45 stops the operation of the drive circuit 50a for the first coil 121 and the operation of the drive circuit 50d for the fourth coil 124 (step S316). More specifically, operation substantially equal to the operation of the configuration of the three coils in the above-mentioned Embodiment 1 is performed.

Next, the controller 45 determines whether or not the elapsed time from the start of the preheating operation exceeds a set time (step S317). The set time may be a value previously set, or may be set to a value input by the user via the operation and display unit 43.

When the elapsed time from the start of the preheating operation exceeds the set time in step S317, the preheating operation is finished, and the mode is shifted from the preheating mode to the normal heating mode.

In the normal heating mode, the controller 45 drives, of the respective coils, the coil over which a load is disposed, and performs a heating operation that corresponds to set heating power or the like input via the operation and display unit 43.

As described above, in Embodiment 5, the kind and the diameter of the heating target 5 are detected using the respective coils having the four-coil structure, and selection of coils to be driven and switching of a driving frequency are performed corresponding to the kind and the diameter of the heating target 5 and hence, unevenness in heating temperature can be suppressed regardless of the kind of heating target 5. Furthermore, when the diameter of the heating target 5 is not equal to or more than the threshold, the driving of the fourth coil 124 is stopped to reduce wasteful energization, thus reducing energy consumption.

Also in Embodiment 5, in the same manner as the above-mentioned Embodiment 4, an intermediate frequency may be adopted as a driving frequency for inductively heating a composite. By adopting the intermediate frequency, uniform heating can be further improved, and it is possible to reduce a loss in the inverter circuit 23 and conductive wires of the coils.

In Embodiment 5, the case where four heating coils are provided has been described. However, the present invention is not limited to such a configuration, and may be applicable to three or more arbitrary heating coils.

When the materials of the heating target 5 disposed above the plurality of heating coils are in the order of a magnetic material, a magnetic material or a composite containing a magnetic material and a non-magnetic material, and a non-magnetic material from the inner peripheral side toward the outer peripheral side of the heating zone, the controller 45 determines that the kind of heating target 5 is a composite.

The controller 45 stops the operation of the drive circuit 50 for the heating coil disposed on the innermost peripheral side. The controller 45 causes the operation of at least one of the drive circuit 50 for the heating coil above which the heating target 5 formed of a magnetic material is disposed and the drive circuit 50 for the heating coil above which the heating target 5 formed of a composite containing a magnetic material and a non-magnetic material is disposed. Furthermore, the controller 45 causes the operation of the drive circuit 50 for the heating coil above which the heating target 5 formed of a non-magnetic material is disposed.

The controller 45 sets a frequency of a high-frequency current of the drive circuit 50 for the heating coil above which the heating target 5 formed of a non-magnetic material is disposed to be higher than a frequency of a high-frequency current of the drive circuit 50 for the heating coil above which the heating target 5 formed of a magnetic material or a composite containing a magnetic material and a non-magnetic material is disposed.

Furthermore, when the heating target 5 disposed above three or more coils disposed adjacent to each other is formed of a magnetic material, the controller 45 determines that the kind of heating target 5 is a magnetic material.

Of the heating coils above which the heating target 5 formed of a magnetic material is disposed, the controller 45 causes the operation of the drive circuit 50 for the heating coil disposed on the innermost peripheral side and the operation of the drive circuit 50 for the heating coil disposed on the outermost peripheral side.

Of the heating coils above which the heating target 5 formed of a magnetic material is disposed, the controller 45 stops the operation of at least one of the drive circuit 50 for the heating coil disposed between the heating coil disposed on the innermost peripheral side and the heating coil disposed on the outermost peripheral side.

Also with such a configuration, advantageous effects substantially equal to the advantageous effects of the above-mentioned Embodiments 1 to 5 can be obtained. Furthermore, it is possible to perform the induction heating suitable for various kinds of heating targets 5 distributed in the market.

In the above-mentioned Embodiments 1 to 5, the configuration where the plurality of heating coils are concentrically disposed has been described. However, the present invention is not limited to such a configuration. For example, the configuration may be adopted where the outer-peripheral coil 113 is divided into four parts each having an approximately ¼ arc shape (a banana shape or a cucumber shape) in a plan view, and the four parts are disposed outside of the intermediate coil 112 to extend along the outer periphery of the intermediate coil 112.

REFERENCE SIGNS LIST

1 first induction heating zone, 2 second induction heating zone, 3 third induction heating zone, 4 top plate, 5 heating target, 6 magnetic material, 11 first induction heating unit, 12 second induction heating unit, 13 third induction heating unit, 21 alternating-current power supply, 22 direct-current power supply circuit, 22a diode bridge, 22b reactor, 22c smoothing capacitor, 23 inverter circuit, 23a, 23b IGBT, 23c, 23d diode, 24a resonant capacitor, 25a input current detecting unit, 25b coil current detecting unit, 40 operation unit, 40a operation unit, 40b operation unit, 40c operation unit, 41 display unit, 41a display unit, 41b display unit, 41c display unit, 43 operation and display unit, 45 controller, 46 load determining unit, 48 memory, 50 drive circuit, 50a drive circuit, 50b drive circuit, 50c drive circuit, 50d drive circuit, 100 induction cooker, 111 inner-peripheral coil, 112 intermediate coil, 113 outer-peripheral coil, 121 first coil, 122 second coil, 123 third coil, 124 fourth coil.

The invention claimed is:

1. An induction cooker comprising:
   a first coil;
   a second coil disposed on an outer peripheral side of the first coil,
   a third coil disposed on an outer peripheral side of the second coil;
   a first inverter circuit configured to supply a first high-frequency current to the first coil;
   a second inverter circuit configured to supply a second high-frequency current to the second coil;
   a third inverter circuit configured to supply a third high-frequency current to the third coil; and
   a controller configured to
      control driving of the first inverter circuit, the second inverter circuit and the third inverter circuit,
      determine whether a heating target is formed of a composite in which the heating target placed above the first coil is detected from the first inverter circuit as formed of a magnetic material, the heating target placed above the second coil is detected from the second inverter circuit as formed of a magnetic material or a composite containing a magnetic material and a non-magnetic material, and the heating target placed above the third coil is detected from the third inverter circuit as formed of a non-magnetic material, and
      responsive to determining that the heating target is formed of the composite:
         stop operation of the first inverter circuit to promote an even heating temperature,
         cause the second inverter circuit and the third inverter circuit to operate, and set a frequency of the third high-frequency current to be higher than a frequency of the second high-frequency current.

2. The induction cooker of claim 1, wherein
the controller
sets electric power to be supplied to the second coil from the second inverter circuit and electric power to be supplied to the third coil from the third inverter circuit to be equal to each other.

3. The induction cooker of claim 1, wherein
when the heating target placed above the first coil, the second coil and the third coil is formed of a magnetic material,
the controller
causes the first inverter circuit and the third inverter circuit to operate, and stops operation of the second inverter circuit.

4. The induction cooker of claim 3, wherein
the controller
sets electric power to be supplied to the third coil from the third inverter circuit to be larger than electric power to be supplied to the first coil from the first inverter circuit.

5. The induction cooker of claim 3, wherein
the controller sets a ratio of electric power per unit area of the third coil to be equal to a ratio of electric power per unit area of the first coil.

6. The induction cooker of claim 1, wherein
the controller
sets the frequency of the second high-frequency current to be higher than a frequency of the first high-frequency current, and to be lower than the frequency of the third high-frequency current.

7. The induction cooker of claim 1, wherein
the controller
sets the frequency of the second high-frequency current to be higher than a frequency of the first high-frequency current by not less than an audible frequency, and to be lower than the frequency of the third high-frequency current by not less than the audible frequency.

8. The induction cooker of claim 1, further comprising:
a top plate on which a heating zone is formed, the heating zone indicating a placement position on which the heating target is to be placed, wherein
the first coil is disposed at a center of the heating zone, and
the second coil and the third coil are disposed concentrically with the first coil.

9. The induction cooker of claim 1, wherein
a switching element of at least one of the first inverter circuit, the second inverter circuit, and the third inverter circuit is formed of a wide-bandgap semiconductor material.

10. The induction cooker of claim 1, further comprising:
a fourth coil disposed on an outer peripheral side of the third coil; and
a fourth inverter circuit configured to supply a fourth high-frequency current to the fourth coil, wherein
when the heating target placed above the first coil is formed of a magnetic material,
the heating target placed above the second coil is formed of a magnetic material or a composite containing a magnetic material and a non-magnetic material,
the heating target placed above the third coil is formed of a magnetic material or a composite containing a magnetic material and a non-magnetic material, and the heating target placed above the fourth coil is formed of a non-magnetic material,
the controller
stops the operation of the first inverter circuit,
causes the second inverter circuit, the third inverter circuit, and the fourth inverter circuit to operate, and
sets a frequency of the fourth high-frequency current to be higher than the frequency of the second high-frequency current and the frequency of the third high-frequency current.

11. The induction cooker of claim 10, wherein
when the heating target placed above the first coil, the second coil, the third coil and the fourth coil is formed of a magnetic material,
the controller
causes the first inverter circuit and the fourth inverter circuit to operate, and
stops operation of at least one of the second inverter circuit and the third inverter circuit.

12. An induction cooker comprising:
a top plate on which a heating zone is formed, the heating zone indicating a placement position on which a heating target is to be placed;
a plurality of coils provided for the heating zone such that three or more coils are provided for one heating zone;
a plurality of inverter circuits configured to supply a high-frequency current to each of the plurality of coils; and
a controller configured to control driving of each of the plurality of inverter circuits,
determine whether the heating target is formed of a composite in which materials of the heating target placed above the plurality of coils are in order of a magnetic material, a magnetic material or a composite containing a magnetic material and a non-magnetic material, and a non-magnetic material from an inner peripheral side toward an outer peripheral side of the heating zone, and
responsive to determining that the heating target is formed of the composite:
stop operation of the inverter circuit for the coil disposed on an innermost peripheral side to promote an even heating temperature,
cause, to operate, at least one of the inverter circuit for the coil above which the heating target formed of a magnetic material is disposed and the inverter circuit for the coil above which the heating target formed of a composite containing a magnetic material and a non-magnetic material is disposed,
cause, to operate, the inverter circuit for the coil above which the heating target formed of a non-magnetic material is disposed, and
set a frequency of the high-frequency current of the inverter circuit for the coil above which the heating target formed of a non-magnetic material is disposed to be higher than a frequency of the high-frequency current of the inverter circuit for the coil above which the heating target formed of a magnetic material or a composite containing a magnetic material and a non-magnetic material is disposed.

13. The induction cooker of claim 12, wherein
when the heating target placed above the coils being three or more coils disposed adjacent to each other is formed of a magnetic material,
the controller
causes, to operate, the inverter circuit for the coil disposed on an innermost peripheral side out of the coils above which the heating target formed of a magnetic material is placed and, to operate, the inverter circuit for the coil disposed on an outermost peripheral side out of the coils above which the heating target formed of a magnetic material is placed, and
stops operation of at least one of the inverter circuits for the coil disposed between the coil disposed on the innermost peripheral side out of the coils above which the heating target formed of a magnetic material is disposed and the coil disposed on the outermost peripheral side out of the coils above which the heating target formed of a magnetic material is disposed.

\* \* \* \* \*